| (12) | United States Patent<br>Dussan et al. | (10) Patent No.: US 11,733,387 B2<br>(45) Date of Patent: *Aug. 22, 2023 |
|---|---|---|

(54) ADAPTIVE LADAR RECEIVER CONTROL USING SPATIAL INDEX OF PRIOR LADAR RETURN DATA

(71) Applicant: AEYE, Inc., Dublin, CA (US)

(72) Inventors: Luis Carlos Dussan, Pleasanton, CA (US); Allan Steinhardt, Brentwood, CA (US); Federico Presutti, Ithaca, NY (US); Joel David Benscoter, Pleasanton, CA (US)

(73) Assignee: AEYE, Inc., Dublin, CA (US)

(*) Notice: Subject to any disclaimer, the term of this patent is extended or adjusted under 35 U.S.C. 154(b) by 1166 days.

This patent is subject to a terminal disclaimer.

(21) Appl. No.: 16/356,079

(22) Filed: Mar. 18, 2019

(65) Prior Publication Data

US 2020/0225324 A1 Jul. 16, 2020

Related U.S. Application Data

(60) Provisional application No. 62/805,781, filed on Feb. 14, 2019, provisional application No. 62/750,540, filed on Oct. 25, 2018.

(51) Int. Cl.
*G01S 17/89* (2020.01)
*G01S 7/484* (2006.01)
(Continued)

(52) U.S. Cl.
CPC .............. *G01S 17/89* (2013.01); *G01S 7/484* (2013.01); *G01S 7/4808* (2013.01);
(Continued)

(58) Field of Classification Search
CPC .... G01S 7/4808; G01S 7/4814; G01S 7/4816; G01S 7/4817; G01S 7/484; G01S 7/4861;
(Continued)

(56) References Cited

U.S. PATENT DOCUMENTS 4,579,430 A 4/1986 Bille
5,552,893 A 9/1996 Akasu
(Continued)

FOREIGN PATENT DOCUMENTS

CN 103885065 A 6/2014
WO 2004034084 A1 4/2004
(Continued)

OTHER PUBLICATIONS

Office Action for U.S. Appl. No. 16/356,101 dated Jun. 12, 2019.
(Continued)

*Primary Examiner* — Yuqing Xiao
*Assistant Examiner* — Benjamin Richard Hebert
(74) *Attorney, Agent, or Firm* — Thompson Coburn LLP

(57) ABSTRACT

Disclosed herein are examples of ladar systems and methods where data about a plurality of ladar returns from prior ladar pulse shots gets stored in a spatial index that associates ladar return data with corresponding locations in a coordinate space to which the ladar return data pertain. This spatial index can then be accessed by a processor to retrieve ladar return data for locations in the coordinate space that are near a range point to be targeted by the ladar system with a new ladar pulse shot. This nearby prior ladar return data can then be analyzed by the ladar system to help define a control parameter for use by the ladar receiver with respect to the new ladar pulse shot.

36 Claims, 21 Drawing Sheets

(51) Int. Cl.

| | | |
|---|---|---|
| *G01S 7/4863* | (2020.01) | |
| *G01S 17/10* | (2020.01) | |
| *G01S 17/00* | (2020.01) | |
| *G01S 7/481* | (2006.01) | |
| *G01S 7/4861* | (2020.01) | |
| *G01S 7/48* | (2006.01) | |
| *G01S 17/93* | (2020.01) | |
| *G01S 17/931* | (2020.01) | |
| *G01S 17/58* | (2006.01) | |
| *G01S 17/46* | (2006.01) | |

(52) U.S. Cl.
CPC .......... *G01S 7/4814* (2013.01); *G01S 7/4816* (2013.01); *G01S 7/4817* (2013.01); *G01S 7/4861* (2013.01); *G01S 7/4863* (2013.01); *G01S 17/006* (2013.01); *G01S 17/10* (2013.01); *G01S 17/58* (2013.01); *G01S 17/93* (2013.01); *G01S 17/931* (2020.01); *G01S 17/46* (2013.01)

(58) Field of Classification Search
CPC .... G01S 7/4863; G01S 7/4866; G01S 17/006; G01S 17/10; G01S 17/46; G01S 17/58; G01S 17/89; G01S 17/93; G01S 17/931
See application file for complete search history.

(56) References Cited

U.S. PATENT DOCUMENTS

| | | | |
|---|---|---|---|
| 5,625,644 A | 4/1997 | Myers | |
| 5,638,164 A | 6/1997 | Landau | |
| 5,808,775 A | 9/1998 | Inagaki et al. | |
| 5,815,250 A | 9/1998 | Thomson et al. | |
| 5,831,719 A | 11/1998 | Berg et al. | |
| 6,031,601 A | 2/2000 | McCusker et al. | |
| 6,205,275 B1 | 3/2001 | Melville | |
| 6,245,590 B1 | 6/2001 | Wine et al. | |
| 6,288,816 B1 | 9/2001 | Melville et al. | |
| 6,847,462 B1 | 1/2005 | Kacyra et al. | |
| 6,926,227 B1 | 8/2005 | Young et al. | |
| 7,038,608 B1 | 5/2006 | Gilbert | |
| 7,206,063 B2 | 4/2007 | Anderson et al. | |
| 7,236,235 B2 | 6/2007 | Dimsdale | |
| 7,436,494 B1 | 10/2008 | Kennedy et al. | |
| 7,602,477 B2 * | 10/2009 | Nakamura | G01S 7/497 |
| | | | 356/5.15 |
| 7,701,558 B2 | 4/2010 | Walsh et al. | |
| 7,800,736 B2 | 9/2010 | Pack et al. | |
| 7,894,044 B1 | 2/2011 | Sullivan | |
| 7,944,548 B2 | 5/2011 | Eaton | |
| 8,072,663 B2 | 12/2011 | O'Neill et al. | |
| 8,081,301 B2 | 12/2011 | Stann et al. | |
| 8,120,754 B2 | 2/2012 | Kaehler | |
| 8,228,579 B2 | 7/2012 | Sourani | |
| 8,427,657 B2 | 4/2013 | Milanovi | |
| 8,635,091 B2 | 1/2014 | Amigo et al. | |
| 8,681,319 B2 | 3/2014 | Tanaka et al. | |
| 8,892,569 B2 | 11/2014 | Bowman et al. | |
| 8,896,818 B2 | 11/2014 | Walsh et al. | |
| 9,069,061 B1 | 6/2015 | Harwit | |
| 9,085,354 B1 | 7/2015 | Peeters et al. | |
| 9,128,190 B1 | 9/2015 | Ulrich et al. | |
| 9,261,881 B1 | 2/2016 | Ferguson et al. | |
| 9,278,689 B1 | 3/2016 | Delp | |
| 9,285,477 B1 | 3/2016 | Smith et al. | |
| 9,305,219 B2 | 4/2016 | Ramalingam et al. | |
| 9,315,178 B1 | 4/2016 | Ferguson et al. | |
| 9,336,455 B1 | 5/2016 | Withers et al. | |
| 9,360,554 B2 | 6/2016 | Retterath et al. | |
| 9,383,753 B1 | 7/2016 | Templeton et al. | |
| 9,437,053 B2 | 9/2016 | Jenkins et al. | |
| 9,516,244 B2 | 12/2016 | Borowski | |
| 9,575,184 B2 | 2/2017 | Gilliland et al. | |
| 9,581,967 B1 | 2/2017 | Krause | |
| 9,841,495 B2 | 12/2017 | Campbell et al. | |
| 9,885,778 B2 | 2/2018 | Dussan | |
| 9,897,687 B1 | 2/2018 | Campbell et al. | |
| 9,897,689 B2 | 2/2018 | Dussan | |
| 9,933,513 B2 | 4/2018 | Dussan et al. | |
| 9,958,545 B2 | 5/2018 | Eichenholz et al. | |
| 10,007,001 B1 | 6/2018 | LaChapelle et al. | |
| 10,042,043 B2 | 8/2018 | Dussan | |
| 10,042,159 B2 | 8/2018 | Dussan et al. | |
| 10,073,166 B2 | 9/2018 | Dussan | |
| 10,078,133 B2 | 9/2018 | Dussan | |
| 10,088,558 B2 | 10/2018 | Dussan | |
| 10,108,867 B1 | 10/2018 | Vallespi-Gonzalez et al. | |
| 10,185,028 B2 | 1/2019 | Dussan et al. | |
| 10,209,349 B2 | 2/2019 | Dussan et al. | |
| 10,215,848 B2 | 2/2019 | Dussan | |
| 10,282,591 B2 | 5/2019 | Lindner et al. | |
| 10,598,788 B1 | 3/2020 | Dussan et al. | |
| 10,656,252 B1 | 5/2020 | Dussan et al. | |
| 10,656,277 B1 | 5/2020 | Dussan et al. | |
| 10,670,718 B1 | 6/2020 | Dussan et al. | |
| 11,327,177 B2 | 5/2022 | Dussan et al. | |
| 2002/0176067 A1 | 11/2002 | Charbon | |
| 2003/0122687 A1 | 7/2003 | Trajkovic et al. | |
| 2003/0151542 A1 | 8/2003 | Steinlechner et al. | |
| 2003/0154060 A1 | 8/2003 | Damron | |
| 2005/0057654 A1 | 3/2005 | Byren | |
| 2005/0216237 A1 | 9/2005 | Adachi et al. | |
| 2006/0007362 A1 | 1/2006 | Lee et al. | |
| 2006/0176468 A1 | 8/2006 | Anderson et al. | |
| 2006/0197936 A1 | 9/2006 | Liebman et al. | |
| 2006/0227315 A1 | 10/2006 | Beller | |
| 2006/0265147 A1 | 11/2006 | Yamaguchi et al. | |
| 2008/0136626 A1 | 6/2008 | Hudson et al. | |
| 2008/0159591 A1 | 7/2008 | Ruedin | |
| 2009/0059201 A1 | 3/2009 | Willner et al. | |
| 2009/0119044 A1* | 5/2009 | Levesque | G01S 7/487 |
| | | | 702/69 |
| 2009/0128864 A1 | 5/2009 | Inage | |
| 2009/0242468 A1 | 10/2009 | Corben et al. | |
| 2009/0292468 A1 | 11/2009 | Wu et al. | |
| 2010/0027602 A1 | 2/2010 | Abshire et al. | |
| 2010/0053715 A1 | 3/2010 | O'Neill et al. | |
| 2010/0165322 A1 | 7/2010 | Kane et al. | |
| 2010/0204964 A1 | 8/2010 | Pack et al. | |
| 2011/0066262 A1 | 3/2011 | Kelly et al. | |
| 2011/0085155 A1 | 4/2011 | Stann et al. | |
| 2011/0097014 A1 | 4/2011 | Lin | |
| 2011/0146908 A1* | 6/2011 | Kobayashi | H01J 37/32192 |
| | | | 156/345.24 |
| 2011/0149268 A1 | 6/2011 | Marchant et al. | |
| 2011/0149360 A1 | 6/2011 | Sourani | |
| 2011/0153367 A1 | 6/2011 | Amigo et al. | |
| 2011/0260036 A1 | 10/2011 | Baraniuk et al. | |
| 2011/0282622 A1 | 11/2011 | Canter | |
| 2011/0317147 A1 | 12/2011 | Campbell et al. | |
| 2012/0038817 A1 | 2/2012 | McMackin et al. | |
| 2012/0044093 A1 | 2/2012 | Pala | |
| 2012/0044476 A1 | 2/2012 | Earhart et al. | |
| 2012/0236379 A1 | 9/2012 | da Silva et al. | |
| 2012/0249996 A1 | 10/2012 | Tanaka et al. | |
| 2012/0257186 A1 | 10/2012 | Rieger et al. | |
| 2013/0206967 A1 | 8/2013 | Shpunt et al. | |
| 2014/0021354 A1 | 1/2014 | Gagnon et al. | |
| 2014/0078514 A1 | 3/2014 | Zhu | |
| 2014/0211194 A1 | 7/2014 | Pacala et al. | |
| 2014/0291491 A1 | 10/2014 | Shpunt et al. | |
| 2014/0300732 A1 | 10/2014 | Friend et al. | |
| 2014/0350836 A1 | 11/2014 | Stettner et al. | |
| 2015/0081211 A1 | 3/2015 | Zeng et al. | |
| 2015/0153452 A1 | 6/2015 | Yamamoto et al. | |
| 2015/0269439 A1 | 9/2015 | Versace et al. | |
| 2015/0304634 A1 | 10/2015 | Karvounis | |
| 2015/0331113 A1 | 11/2015 | Stettner et al. | |
| 2015/0369920 A1 | 12/2015 | Setono et al. | |
| 2015/0378011 A1 | 12/2015 | Owechko | |
| 2015/0378187 A1 | 12/2015 | Heck et al. | |
| 2016/0003946 A1 | 1/2016 | Gilliland et al. | |

(56) References Cited

U.S. PATENT DOCUMENTS

| | | |
|---|---|---|
| 2016/0005229 A1 | 1/2016 | Lee et al. |
| 2016/0041266 A1 | 2/2016 | Smits |
| 2016/0047895 A1 | 2/2016 | Dussan |
| 2016/0047896 A1 | 2/2016 | Dussan |
| 2016/0047897 A1 | 2/2016 | Dussan |
| 2016/0047898 A1 | 2/2016 | Dussan |
| 2016/0047899 A1 | 2/2016 | Dussan |
| 2016/0047900 A1 | 2/2016 | Dussan |
| 2016/0047903 A1 | 2/2016 | Dussan |
| 2016/0146595 A1 | 5/2016 | Boufounos et al. |
| 2016/0157828 A1 | 6/2016 | Sumi et al. |
| 2016/0274589 A1 | 9/2016 | Templeton et al. |
| 2016/0293647 A1 | 10/2016 | Lin et al. |
| 2016/0320486 A1 | 11/2016 | Murai et al. |
| 2016/0370462 A1* | 12/2016 | Yang ............... G01S 7/4815 |
| 2016/0379094 A1 | 12/2016 | Mittal et al. |
| 2017/0158239 A1 | 6/2017 | Dhome et al. |
| 2017/0176990 A1* | 6/2017 | Keller ............... G01S 7/4802 |
| 2017/0199280 A1 | 7/2017 | Nazemi et al. |
| 2017/0205873 A1 | 7/2017 | Shpunt et al. |
| 2017/0211932 A1 | 7/2017 | Zadravec et al. |
| 2017/0219695 A1 | 8/2017 | Hall et al. |
| 2017/0234973 A1 | 8/2017 | Axelsson |
| 2017/0242102 A1 | 8/2017 | Dussan et al. |
| 2017/0242103 A1 | 8/2017 | Dussan |
| 2017/0242104 A1 | 8/2017 | Dussan |
| 2017/0242105 A1 | 8/2017 | Dussan et al. |
| 2017/0242106 A1 | 8/2017 | Dussan et al. |
| 2017/0242107 A1 | 8/2017 | Dussan et al. |
| 2017/0242108 A1 | 8/2017 | Dussan et al. |
| 2017/0242109 A1 | 8/2017 | Dussan et al. |
| 2017/0263048 A1 | 9/2017 | Glaser et al. |
| 2017/0269197 A1 | 9/2017 | Hall et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0307876 A1 | 10/2017 | Dussan et al. |
| 2018/0031703 A1 | 2/2018 | Ngai et al. |
| 2018/0045816 A1* | 2/2018 | Jarosinski ............ G01S 7/4863 |
| 2018/0059248 A1 | 3/2018 | O'Keeffe |
| 2018/0075309 A1 | 3/2018 | Sathyanarayana et al. |
| 2018/0081034 A1* | 3/2018 | Guo ............... G06F 16/1737 |
| 2018/0120436 A1 | 5/2018 | Smits |
| 2018/0137675 A1* | 5/2018 | Kwant ............... G06T 17/20 |
| 2018/0143300 A1 | 5/2018 | Dussan |
| 2018/0143324 A1 | 5/2018 | Keilaf et al. |
| 2018/0188355 A1 | 7/2018 | Bao et al. |
| 2018/0224533 A1 | 8/2018 | Dussan et al. |
| 2018/0238998 A1 | 8/2018 | Dussan et al. |
| 2018/0239000 A1 | 8/2018 | Dussan et al. |
| 2018/0239001 A1 | 8/2018 | Dussan et al. |
| 2018/0239004 A1 | 8/2018 | Dussan et al. |
| 2018/0239005 A1 | 8/2018 | Dussan et al. |
| 2018/0284234 A1 | 10/2018 | Curatu |
| 2018/0284278 A1 | 10/2018 | Russell et al. |
| 2018/0284279 A1 | 10/2018 | Campbell et al. |
| 2018/0299534 A1 | 10/2018 | LaChapelle et al. |
| 2018/0306905 A1 | 10/2018 | Kapusta et al. |
| 2018/0306926 A1* | 10/2018 | LaChapelle ......... H01L 31/1085 |
| 2018/0306927 A1 | 10/2018 | Slutsky et al. |
| 2018/0341103 A1 | 11/2018 | Dussan et al. |
| 2018/0348361 A1 | 12/2018 | Turbide |
| 2019/0025407 A1 | 1/2019 | Dussan |
| 2019/0041521 A1 | 2/2019 | Kalscheur et al. |
| 2019/0086514 A1 | 3/2019 | Dussan et al. |
| 2019/0086550 A1 | 3/2019 | Dussan et al. |
| 2019/0113603 A1 | 4/2019 | Wuthishuwong et al. |
| 2019/0212450 A1 | 7/2019 | Steinberg et al. |
| 2020/0044336 A1* | 2/2020 | Dani ............... H03F 3/211 |
| 2020/0132818 A1 | 4/2020 | Dussan et al. |

FOREIGN PATENT DOCUMENTS

| | | |
|---|---|---|
| WO | 2006/076474 A1 | 7/2006 |
| WO | 2008008970 A2 | 1/2008 |
| WO | 2016025908 A2 | 2/2016 |
| WO | 2017/143183 A1 | 8/2017 |
| WO | 2017/143217 A1 | 8/2017 |
| WO | 2018/152201 A1 | 8/2018 |
| WO | 2019010425 A1 | 1/2019 |

OTHER PUBLICATIONS

Office Action for U.S. Appl. No. 16/356,116 dated Jul. 25, 2019.

Schubert et al., "How to Build and Customize a High-Resolution 3D Laserscanner Using Off-The-Shelf Components", preprint for Towards Autonomous Robotic Systems, 2016.

Notice of Allowance for U.S. Appl. No. 16/356,116 dated Mar. 25, 2020.

Prosecution history for U.S. Appl. No. 16/356,046, filed Mar. 18, 2019, now U.S. Pat. No. 10,656,252 issued May 19, 2020.

"Compressed Sensing," Wikipedia, 2019, downloaded Jun. 22, 2019 from https://en.wikipedia.org/wiki/Compressed_sensing, 16 pgs.

"Entrance Pupil," Wikipedia, 2016, downloaded Jun. 22, 2019 from https://enwikipedia.org/wiki/Entrance_pupil, 2 pgs.

Analog Devices, "Data Sheet AD9680", 98 pages, 2014-2015.

Chen et al., "Estimating Depth from RGB and Sparse Sensing", European Conference on Computer Vision, Springer, 2018, pp. 176-192.

Donoho, "Compressed Sensing", IEEE Transactions on Inmformation Theory, Apr. 2006, vol. 52, No. 4, 18 pgs.

Howland et al., "Compressive Sensing LIDAR for 3D Imaging", Optical Society of America, May 1-6, 2011, 2 pages.

Kessler, "An afocal beam relay for laser XY scanning systems", Proc. of SPIE vol. 8215, 9 pages, 2012.

Kim et al., "Investigation on the occurrence of mutual interference between pulsed terrestrial LIDAR scanners", 2015 IEEE Intelligent Vehicles Symposium (IV), Jun. 28-Jul. 1, 2015, COEX, Seoul, Korea, pp. 437-442.

Maxim Integrated Products, Inc., Tutorial 800, "Design A Low-Jitter Clock for High Speed Data Converters", 8 pages, Jul. 17, 2002.

Meinhardt-Llopis et al., "Horn-Schunk Optical Flow with a Multi-Scale Strategy", Image Processing Online, Jul. 19, 2013, 22 pages.

Moss et al., "Low-cost compact MEMS scanning LADAR system for robotic applications", Proc. of SPIE, 2012, vol. 8379, 837903-1 to 837903-9.

Office Action for U.S. Appl. No. 16/356,046 dated Jun. 3, 2019.

Office Action for U.S. Appl. No. 16/356,089 dated Jun. 12, 2019.

Redmayne et al., "Understanding the Effect of Clock Jitter on High Speed ADCs", Design Note 1013, Linear Technology, 4 pages, 2006.

Rehn, "Optical properties of elliptical reflectors", Opt. Eng. 43(7), pp. 1480-1488, Jul. 2004.

Sharafutdinova et al., "Improved field scanner incorporating parabolic optics. Part 1: Simulation", Applied Optics, vol. 48, No. 22, p. 4389-4396, Aug. 2009.

U.S. Appl. No. 16/106,350, filed Aug. 21, 2018.

U.S. Appl. No. 16/106,406, filed Aug. 21, 2018.

Prosecution history for U.S. Appl. No. 16/356,089, filed Mar. 18, 2019, now U.S. Pat. No. 10,598,788 issued Mar. 24, 2020.

Prosecution history for U.S. Appl. No. 16/356,101, filed Mar. 18, 2019, now U.S. Pat. No. 10,656,277 issued May 19, 2020.

Prosecution history for U.S. Appl. No. 16/356,116, filed Mar. 18, 2019, now U.S. Pat. No. 10,670,718 issued Jun. 2, 2020.

Prosecution history for U.S. Appl. No. 16/356,061, filed Mar. 18, 2019, now U.S. Pat. No. 11,327,177 issued May 10, 2022.

* cited by examiner

```
SearchNN(x, y, R):
 NN leaf list = {}
 node stack = {}
 stack <-- tree root
 while stack not empty:
 -pop node off stack
 -for each node's children
 --if child is a node, is active and distance from x, y <= R:
 ---stack <-- node
 --if child a leaf, is active and distance from x, y <= R:
 ---list <-- leaf
 --(else ignore this child)
 return leaf list
```

Figure 3B

1. Using quad tree feedback energy control, construct a ladar intensity map of the road surface
2. Detect contiguous regions of intensity lower than the ambient found in 1.
3. Detect the presence of an obstacle.

1 Detect the presence of interference in a voxel by contrasting quad tree interpolation against measure return 2 Localize the interference using a shot cluster around the voxel 3 Adjust the azimuth and elevation of the laser shot of said voxel at next frame to graze the interference gaze angle while still covering nearby potential objects

Figure 11

1: Monitor detections at range within phone damage range [nominally 1 foot]

2: Use adaptive feedback to reduce laser energy, as controlled by chosen set point 3: If camera (or other nearby obstacle) persists, adjust shot list to exclude illumination of said object

Figure 12A

ADAPTIVE LADAR RECEIVER CONTROL USING SPATIAL INDEX OF PRIOR LADAR RETURN DATA

CROSS-REFERENCE AND PRIORITY CLAIM TO RELATED PATENT APPLICATIONS

This patent application claims priority to U.S. provisional patent application Ser. No. 62/750,540, filed Oct. 25, 2018, and entitled "Adaptive Control of Ladar Systems Using Spatial Index of Prior Ladar Return Data", the entire disclosure of which is incorporated herein by reference.

This patent application also claims priority to U.S. provisional patent application Ser. No. 62/805,781, filed Feb. 14, 2019, and entitled "Adaptive Control of Ladar Systems Using Spatial Index of Prior Ladar Return Data", the entire disclosure of which is incorporated herein by reference.

This patent application is also related to (1) U.S. patent application Ser. No. 16/356,046, filed this same day, and entitled "Adaptive Control of Ladar Systems Using Spatial Index of Prior Ladar Return Data", now U.S. Pat. No. 10,656,252, (2) U.S. patent application Ser. No. 16/356,061, filed this same day, and entitled "Adaptive Control of Ladar Shot Energy Using Spatial Index of Prior Ladar Return Data", now U.S. Pat. No. 11,327,177, (3) U.S. patent application Ser. No. 16/356,089, filed this same day, and entitled "Adaptive Control of Ladar Shot Selection Using Spatial Index of Prior Ladar Return Data", now U.S. Pat. No. 10,598,788, (4) U.S. patent application Ser. No. 16/356,101, filed this same day, and entitled "Adaptive Control of Ladar System Camera Using Spatial Index of Prior Ladar Return Data", now U.S. Pat. No. 10,656,277, and (5) U.S. patent application Ser. No. 16/356,116, filed this same day, and entitled "System and Method for Synthetically Filling Ladar Frames Based on Prior Ladar Return Data", now U.S. Pat. No. 10,670,718, the entire disclosures of each of which are incorporated herein by reference.

INTRODUCTION

Safe autonomy in vehicles, whether airborne, ground, or sea-based, relies on rapid precision, characterization of, and rapid response to, dynamic obstacles. Ladar systems are commonly used for detecting such obstacles. As used herein, the term "ladar" refers to and encompasses any of laser radar, laser detection and ranging, and light detection and ranging ("lidar").

However, it is sometimes the case that artifacts and noise may be present in the ladar return data and ladar images used for object detection with autonomous vehicles. Such artifacts and noise can hamper the analysis operations that are performed on the ladar return data. For example, machine learning is often used to train an image classifier from a set of ladar images so that the trained image classifier can accurately detect and classify different types of objects in images. However, the presence of artifacts and noise in the ladar images can corrupt the training process and/or the classification process, which can lead to a risk of misclassification during vehicle operation.

The inventors believe that some of the artifacts and noise present in ladar return data arise from non-uniform illumination of the field of view by the ladar system. More particular, the ladar system may illuminate some portions of the field of view with ladar pulses more heavily than other portions of the field of view.

Accordingly, in an example embodiment, the inventors disclose a ladar system that adapts shot energy for the ladar transmitter as a function of prior ladar return data so that the ladar system can achieve a more uniform illumination (or smoother illumination) of nearby parts of the field of view. Accordingly, the ladar transmitter may adjust its shot energy on a shot-by-shot basis for interrogating range points that are near each other in the field of view. It should be understood that the goal of increasing the uniformity or smoothness of illumination by the ladar transmitter over a region of nearby portions of the field of view does not require the ladar transmitter to produce equal illumination for each range point in that region. Instead, it should be understood that increased uniformity or smoothness is a soft term that relates to a gradient of intensities that is sufficiently mild so as to not unduly erode the performance of object classification algorithms (many of which may be powered by machine learning techniques, edge detection processes, bounding boxes, and others).

Furthermore, a number of factors can make the goal of increasing the uniformity illumination technically challenging. First, the propagation characteristics of the environment between the ladar transmitter and the targeted range point may be variable. For example, the amount of atmospheric attenuation often varies, which can yield fluctuations in the energy levels of the ladar return data. Second, the energy discharged by the ladar transmitter can vary from shot-to-shot. This can be especially true for lasers which have adjustable pulse energy, such as with many fiber lasers. Third, the angular sensitivity of the ladar receiver may vary. This can be most notable in bistatic operations where the ladar system scans on transmit but not on receive. In such a case, the ladar return data detected by the ladar receiver may exhibit angular variation, whether it be a focal plane array or a non-imaging system.

Accordingly, for example embodiments, the inventors believe that ladar system adaptation should be based on the observed behavior of the ladar returns. Because current lasers operate at a fast re-fire rate (e.g., 100,000 to 3,000,000 shots per second is typical), this means that using ladar return data to adapt the ladar system with low latency is a computationally-challenging task. For example, a ladar system might scan a 300 m swath, in which case the last ladar return arrives at the ladar receiver around 2 microseconds (us) after ladar pulse launch from the ladar transmitter. If there are 300,000 ladar pulse shots per second, this leaves only about 1.3 us to detect ladar pulse returns, estimate the shot energy desired for the next ladar pulse shot (to more uniformly illuminate a region of the field of view), and then prime the laser pump for that next ladar pulse shot (if it is desired for the ladar system to have the ability to adapt shot energy on a shot-by-shot basis). Given that many pulsed lasers have bandwidths close to 1 GHz, this is a daunting computational task as well as a daunting data management task.

In order to provide a solution to this problem in the art, the inventors disclose example embodiments where the ladar system stores data about a plurality of ladar returns from prior ladar pulse shots in a spatial index that associates ladar return data with corresponding locations in a coordinate space to which the ladar return data pertain. This spatial index can then be accessed by a processor to retrieve ladar return data for locations in the coordinate space that are near a range point to be targeted by the ladar system with a new ladar pulse shot. This nearby prior ladar return data can then be analyzed by the ladar system to help define a shot energy for use by the ladar system with respect to the new ladar pulse shot. Accordingly, the shot energy for ladar pulse shots can be adaptively controlled to achieve desired level of illumination for the range points within a defined vicinity of each other in the coordinate space (e.g., a more uniform level of illumination).

The spatial index of prior ladar return data can take the form of a tree structure that pre-indexes the prior ladar return data, where the tree structure has a root node, a plurality of branches (with associated branch nodes), and a plurality of leaf nodes, wherein the leaf nodes associate the ladar return data with corresponding locations in the coordinate space. Through such a tree structure, rapid lookups to find the prior ladar return data for locations within a defined vicinity of the new ladar pulse shot can be performed. As an example, the tree structure can be a quad tree index, where 4 leaf nodes are linked to a common first level branch, 4 first level branches are linked to a common second level branch, and so on until the root node is reached, and where the branch topology is selected to reflect spatial proximity. The computational complexity of performing data retrieval from an example quad tree index is $2 \, p \, \log_4(m)$, where m is the number of rows and columns in the coordinate space grid, and where p is the number of prior ladar returns to retrieve and inspect. In contrast, without pre-indexing, the complexity, including memory fetches, to retrieve p prior ladar returns would be approximately $pm^2$. For a ¼ Mega-pixel ladar frame, the cost savings (for a given p) of using a quad tree index to pre-index the prior ladar return data is on the order of 55 times. The savings are even more dramatic, since the dominating component of the computational complexity for quad tree indexes is p rather than m, and where p varies with the search radius R used in an example embodiment to govern the locations in the coordinate space are deemed to be within the defined vicinity of the new ladar pulse shot.

While an example embodiment uses the spatial index of prior return ladar to adaptively control shot energy, it should be understood that in other example embodiments parameters of the ladar system other than shot energy can be adaptively controlled based on the spatial index of prior return ladar. For example, the detector and/or comparison thresholds used by the ladar receiver can be adaptively controlled using the spatial index. As another example, shot selection itself can be adaptively controlled using the spatial index. For example, with respect to adaptive shot selection, the techniques used for the adaptive modification of the spatial index can be used to preemptively reduce the number of required shots in the shot selection stage. As an example, the system can use super-resolution to interpolate by dropping random shots. As another example, the system can use optical flow techniques in combination with spatial indexes to adapt shot selection.

These and other features and advantages of the present invention will be described hereinafter to those having ordinary skill in the art.

BRIEF DESCRIPTION OF THE DRAWINGS

FIG. 3B shows example pseudo-code for the portions of FIG. 3A relating to searching the spatial index to find nearby prior ladar return data.

FIG. 11 shows an example use case for leveraging a spatial index of prior ladar return data to detect and adapt to interference.

FIG. 12A shows an example use case for leveraging a spatial index of prior ladar return data to detect and adapt to the presence of nearby camera phones.

DETAILED DESCRIPTION OF EXAMPLE EMBODIMENTS

Figure 1A:
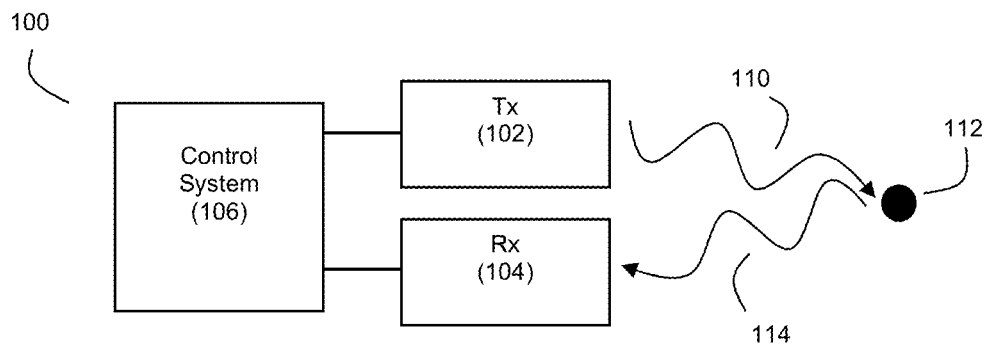
FIG. 1A shows an example ladar system for use in an example embodiment.

FIG. 1A shows an example ladar system 100. The ladar system 100 comprises a ladar transmitter 102, a ladar receiver 104, and a control system 106. The ladar transmitter 102 is configured to generate and transmit ladar pulses 110 into the environment toward targeted range points (e.g., range point 112). The ladar receiver 104 is configured to receive and detect incident light that may include ladar pulse reflections 114 from targeted range points such as range point 112. The control system 106 can be configured to control how its corresponding ladar transmitter 102 and ladar receiver 104 operate. Examples of suitable ladar systems 100 are disclosed and described in greater detail in U.S. Pat. App. Pubs. 2016/0047895, 2017/0242106, 2017/0307876, 2018/0238998, and U.S. patent application Ser.

No. 16/106,350, entitled "Intelligent Ladar System with Low Latency Motion Planning Updates", filed Aug. 21, 2018; the entire disclosures of each of which are incorporated herein by reference. For example, the ladar system 100 may employ a ladar transmitter 102 (as described in the above-referenced and incorporated patent applications) that includes scanning mirrors and uses a range point down selection algorithm to support pre-scan compression (which can be referred herein to as "compressive sensing" or "compressive scanning"). Such an embodiment may also include an environmental sensing system that provides environmental scene data to the ladar transmitter to support the range point down selection. Through the use of pre-scan compression, such a ladar transmitter can better manage shot rate and digital input/output bandwidth through intelligent range point target selection. Furthermore, because the detection and image quality for a ladar system varies roughly as the square root of the number of pulses used per point cloud, this means that reducing the required number of communication pulses via the compressive sensing enhances the signal to noise ratio (SNR), enabling robust pulse collision avoidance without greatly reducing detection range or position accuracy. While these referenced and incorporated patent applications describe example embodiments for ladar systems 100, it should nevertheless be understood that practitioners may choose to implement the ladar systems 100 differently than as disclosed in these referenced and incorporated patent applications.

Figure 1B:
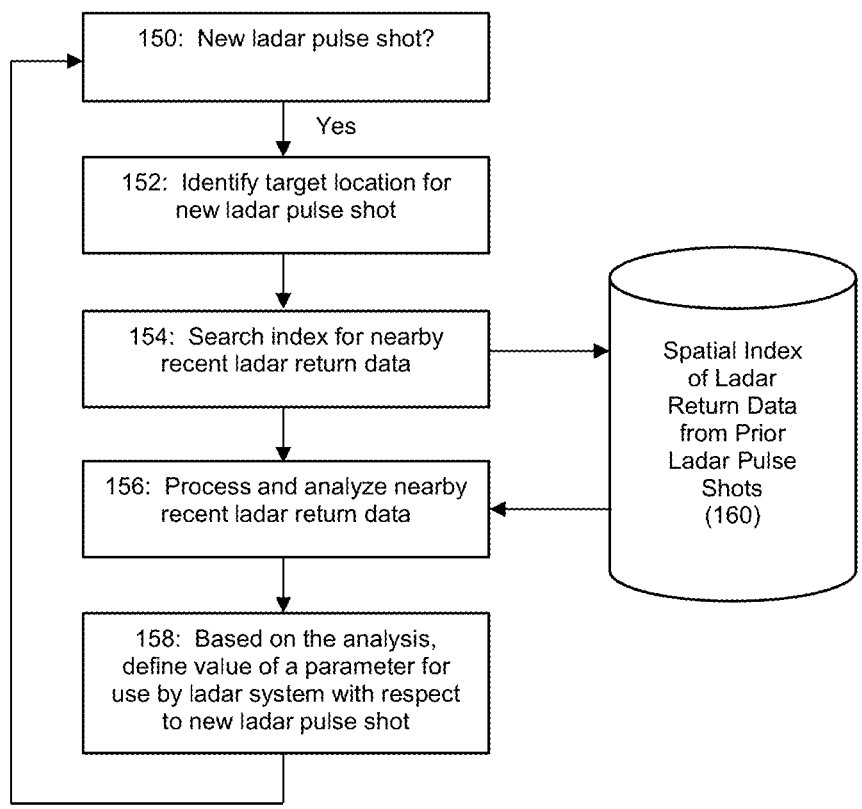
FIG. 1B shows an example process flow that leverages a spatial index of prior ladar return data to define a parameter value for use by the ladar system with respect to a new ladar pulse shot.

FIG. 1B shows an example process flow for execution by a processor within control system 106. This process flow leverages a spatial index of prior ladar return data to define a parameter value for use by the ladar system 100 with respect to a new ladar pulse shot.

At step 150, the processor determines whether a new ladar pulse shot is to be taken. As explained in the above-referenced and incorporated patent applications, the processor can identify new ladar pulse shots based on a shot list that includes an ordered listing of ladar pulse shots. Each ladar pulse shot can be identified by the coordinates of the range point to be targeted by that ladar pulse shot. For example, these coordinates can be identified by x,y values in terms of elevation and azimuth in a field of view coordinate space for the ladar transmitter 102. Rectangular to polar conversion can be applied if necessary to translate coordinates from one system to another, folding in an additional parameter, mainly range. Such range point coordinates can be referred to as pixel locations for the ladar system 100. The range point coordinates for the new ladar pulse shot are then identified by the processor at step 152.

Next, at step 154, the processor searches a spatial index 160 to find prior ladar return data for range points that are near the target location identified at step 152. The spatial index 160 associates return data from prior ladar pulse shots with the locations of the range points targeted by those prior ladar pulse shots. Accordingly, step 154 can define a vicinity around the identified range point location from step 152 to establish the zone of range point locations that will qualify as being "nearby" the targeted range point. As an example, the nearby vicinity can be defined in terms of a radius around the targeted range point location (e.g., where such a radius value can be expressed as a count of pixels or some other suitable unit). Prior ladar return data that is associated with a location within such a defined vicinity is then located within the spatial index 160 as a result of step 154.

At step 156, the processor processes and analyzes the nearby prior ladar return data from step 154. The analysis that is performed at step 156 can vary based on the type of control that a practitioner wants to employ over the ladar system. For example, if a practitioner wants to increase the uniformity of illumination of nearby range points by the ladar transmitter 102, step 156 can include an analysis where the intensity of nearby ladar returns can be analyzed. As another example, if a practitioner wants to exercise adaptive control over shot selection, an absence or sparseness of returns analyzed at step 156 can be construed by the processor as an indication that the region has nothing of interest, in which case shot selection can be adjusted to adopt a sparser sampling (e.g., if the ladar system is pointing into the open sky, it may be desirable to only sparsely sample such empty space). Similarly, if the analysis of the returns reveals a relatively uniform intensity, this may be indicative of an amorphous heterogeneous background (e.g., road, dirt, grass, etc.), which the processor may construe as indicating a relaxing of that region's scan priority in favor of more intensity dynamic regions. The returns can also be analyzed for changes in texture, using techniques such as Markovian field parameter estimation. This allows the user to segment the image based not on edges or range but rather on spatial stochastic properties of surfaces, enabling for example a lidar-only characterization of grass versus asphalt.

At step 158, the processor applies the analysis from step 156 to define a value for a parameter used by the ladar system 100 with respect to the new ladar pulse shot. The nature of step 158 can also vary based on the type of control that a practitioner wants to employ over the ladar system. For example, if a practitioner wants to increase the uniformity of illumination of nearby range points by the ladar transmitter 102, step 158 can define a shot energy for the new ladar pulse shot so that the ladar pulse shot would illuminate the targeted range point with an energy amount that is derived from the intensities of the prior ladar returns from nearby range points. As another example, step 158 can involve defining values used by the ladar receiver 104 with respect to detection/comparison thresholds. As yet another example, step 158 can involve tagging the new ladar pulse shot as a shot not to be taken or to be deferred if the prior ladar pulse return data for nearby range points indicates there may be an occlusion or other factor that would make the return data unreliable. Additional details about such examples are discussed below with reference to example embodiments.

Figure 2A:
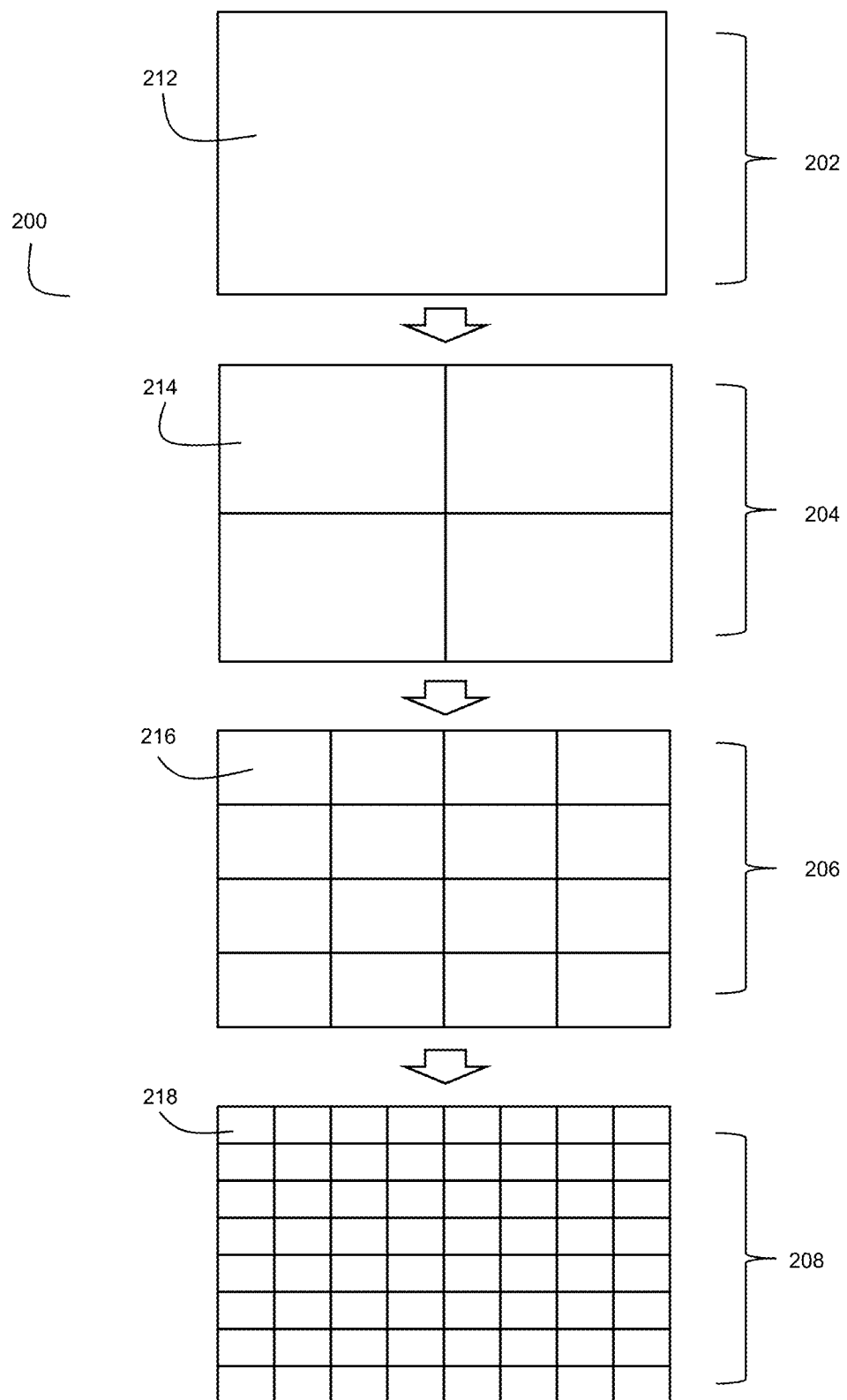
FIG. 2A shows an example quad tree index structure for associating prior ladar pulse return data with locations in a coordinate space from which the prior ladar pulse return data was obtained.

FIG. 2A depicts an example tree structure 200 for a spatial index 160. As can be seen, the tree structure 200 can be hierarchical with multiple levels. In the example of FIG. 2A, the tree structure 200 includes a first level 202, a second level 204, a third level 206, and a fourth level 208. In this example, the fourth level 208 will be the lowest level and will define a number of cells 218 that subdivide the field of view for the ladar system 100 into different spatial locations at the lowest level of granularity with respect to the subject tree structure 200. Each cell 218 can be characterized as a pixel location in the ladar system's field of view, and can be indexed by an x,y coordinate pair that would correspond to elevation/azimuth values in the field of view. Populating each cell 218 can be data that describes a prior ladar pulse return from a range point at that coordinate. Examples of ladar return data that can be used to populate cells 218 can include range and intensity information for the range point location corresponding to the subject ladar return. But, the ladar return data may also or alternatively include additional information such as features of the detected return (e.g., target shape in range), noise level data for the ladar return from the subject range point location, pulse shape data for the ladar return from the subject range point location, multiple returns (when there are multiple objects at a given azimuth and elevation beam at two or more distinct range positions in depth—where this is, for example, a frequent occurrence at long range on busy roads). It may also be desirable to record the exact time of collection of each pulse return (which may be measured with granularity that is orders of magnitude tighter than the frame time). Time of collection, more precisely the exact time that each pulse is launched, can be presented as a time stamp, e.g. a time stamp data tag. Such a time stamp can be useful for fusing data from other sensors, such as radar, sonar etc. Other examples of data that can reside in the leaf nodes can include camera data (red green blue, polarization), map data (such as terrain height, and terrain classification (e.g., building, foliage, dirt etc.)), and/or velocity of objects detected using intershot range detection.

In the example of FIG. 2A, the tree structure 200 is arranged as a quad tree index. Accordingly, each higher layer level operates to group 4 cells within the immediate lower layer level. Thus, each cell 216 in level 206 operates to group a 2×2 array of cells 218 from level 208. Such grouping can start from the upper left corner and work its way across and down the array. However, it should be understood that the grouping could start from other origins (e.g., upper left corner, lower left corner, lower right corner, mid-point, etc.). Given that the example of FIG. 2A shows an 8×8 array at lowest level 208, this means that level 206 has a 4×4 array of cells 216, level 204 has a 2×2 array of cells 214, and the highest layer level 202 is a single cell 212 (e.g., the full frame of the field of view). Level 202/cell 212 can also be referred to as the root node since it references the entire field of view for a subject frame. Each cell within the tree structure 200 can be referred to as a node; and the cells 218 within lowest level 208 can be referred to as leaf nodes, while the cells in the higher layer levels above the leaf nodes and under the root node can be referred to as branch nodes (or standard nodes or non-leaf nodes). Branches link the nodes together.

Through the hierarchical spatial organization of the tree structure 200 shown by FIG. 2A, efficient lookups can be performed to locate the range point cells that are nearby a range point cell corresponding to a new ladar pulse shot. Each node in the tree structure 200 can encode the status of its descendants. Thus, if there are any active leaf nodes under a given node/branch, then that node/branch can also be encoded as an "active" node/branch. A leaf node can be deemed "active" if it holds ladar return data that is considered to have been recently obtained, as discussed in greater detail below. Such status encoding can help contribute to fast lookups in the tree structure 200 because it can pre-index which branches have active ladar return data below them. Furthermore, each branch node in the tree structure can also identify the boundaries (e.g., 2D boundary; which may take the form of a rectangle described by 4 numerical values— the upper left and lower right corner coordinates, for example) within which all of its descendant nodes lie. Such boundary encoding can also help support fast lookups of active leaf nodes within a specified proximity of a point of interest. Even in worst case scenarios where the range point location corresponding to a new ladar pulse shot is located on a cell 218 that lies on a corner boundary of a high level cell (such as the corner of one of the cells 214 in level 204), there will be a fixed maximum number of lookups that would need to performed derived from the relationship of $2p\log_4(m)$ discussed above to find all cells 218 within a defined radius R of the subject cell. Because of the spatial organization of the cells 218 in the tree structure 200, nearby cells can be located by traversing the tree structure 200 to higher layer levels as needed, shifting to an adjacent cell, and then traveling back down to low level cells 218 under the adjacent cell as needed.

With the example of FIG. 2A, the tree structure 200 will have a root node 202/212 that then spatially subdivides the coordinate space via branch nodes 214 and 216 in levels 204 and 206 down to spatially grouped leaf nodes 218 in the lowest level 218. As noted, the prior ladar return data can be stored in these leaf nodes. The spatial extent of a leaf node 218 is typically bounded below by the angular resolution of the ladar system. So, for example, if the beam resolution is 0.1 degrees, a practitioner can set the resolution to 0.1 degrees, but may choose it higher, perhaps 1 degree. The trade here is on computation resources spent accessing and comparing data within a cell/node, versus comparing the data between nodes. The trade can also be on the spatial variation of intensity; the faster it changes the smaller the angular extent. As an example, we may elect to use as spatial extent the width of a road at a given reference range depth. This would be appropriate when the primary search would be for discerning texture changes.

Also, while the example of FIG. 2A shows the lowest level 208 comprising an 8×8 array of cells 218, it should be understood that in many embodiments, there will be much larger numbers of cells 218 in the lowest level 218. For example, in a 1 million pixel ($\sim 2^{20}$) array for ladar frames, the tree depth is $\log_4 4^{10}=10$, and the lowest level 208 can be a 1000×1000 array of cells 218. Also, while the example of FIG. 2A shows the tree structure 200 as a quad tree index, it should be understood that other groupings could be used, such as an octree index. An octree index may be desirable if the tree structure seeks to embed 3-dimensional (3D) spatial information directly, where depth is explicitly taken into consideration in its indexing of nodes, as opposed to a quad tree index where depth can reside inside a leaf node as opposed to living in the tree index map itself. Thus, while the quad tree index can spatially index the ladar return data in a 2D pixel coordinate space, an octree index can spatially index the ladar return data in a 3D voxel coordinate space. Indexing voxels can involve creating 2×2×2 cubes as leaf node pairings and where the additional dimension corresponds to the range for the subject range point. With an octree embodiment, a practitioner may then choose to also take an expected range for a targeted range point into consideration when determining which voxels are deemed to be in the vicinity of the targeted range point.

In an example embodiment, the root node 202/212 can address the entire corpus of prior ladar return data indexed by the tree structure 200. This corpus can correspond to a single frame of prior ladar return data, multiple frames of prior ladar return data over a defined time period, or other groupings of prior ladar return data. It should be understood that the tree structure 200 provides a scheme for indexing cells. The content in the leaf node cells can be whatever a practitioner decides. If multiple frames reside in a single tree structure 200, then it may be desirable for the leaf nodes to provide an age index, e.g. how many frames ago it was shot. This could be generalized to an absolute time stamp, if desired. If age is above a specified user threshold, leaf/nodes are then determined "stale", and recursively deactivated. In example embodiments where the ladar system employs compressive sensing/scanning, it should be understood that a frame can be a fluid frame given that the same shots will presumably not be collected from frame-to-frame. This stands in contrast to non-agile ladar systems where a frame is a fixed set of range points, fired repeatedly and invariantly.

With an agile ladar system that employs compressive sensing/scanning, a frame can be viewed as a collection of range point shots that loosely encompasses a field of view, and a subsequent frame revisits said view, albeit in a modified manner (e.g., different range points being targeted with shots).

Recall, by definition, each potential leaf node can be associated with a status identifier that identifies whether that leaf node is considered "active" or not. Deactivating leafs nodes in general may also lead to deactivating branches and branch nodes leading to that deactivated leaf node. Indeed, this is the power of a quad tree index when used with an agile ladar system that employs compressive sensing/scanning because a vast majority of leaf nodes are never searched since they are not active. The processor tracks which leaf nodes should be defined as active based on the freshness or staleness of their respective ladar return data. For instance, the system can time tag returns so that a leaf node can be denoted as "stale" if all time stamps are old, and "fresh" if it contains fresh ladar return data. The processor can then track which leaf nodes to search across based on the freshness or staleness of their respective ladar return data, by inspecting associated (currently) active leaf nodes. If the leaf node is inactive, one can simply write over the stale ladar return data still stored by that leaf node the next time that the ladar system receives return data for the range point corresponding to that leaf node.

A practitioner may employ a constraint on how long the tree structure 200 holds prior ladar return data; a practitioner may not want "stale" ladar return data to influence the adaptive control of the ladar system on the assumption that conditions may have changed since the time that "stale" ladar return data was captured relative to the current time. The precise time durations or similar measures employed by the ladar system 100 to effectively flush itself of "stale" ladar return data can vary based on the needs and desires of a practitioner. For example, in some example embodiments, it may be desirable to flush the tree structure of prior ladar return data after each ladar frame is generated. In other example embodiments, it may be desirable to flush the tree structure of prior ladar return data after a defined sequence of ladar frames has been generated (e.g., holding the ladar return data for a given frame for a duration of, say, 3 ladar frames such that the returns for the oldest of the 3 ladar frames is dropped when a new ladar frame is started). In other example embodiments, it may be desirable to manage the ladar return data on a shot-by-shot basis where ladar return data is held in the tree structure for X number of shots. It is also possible to hold the tree structure 200 for an amount of time which is data dependent. For example, a practitioner may elect to reset the tree structure 200 whenever the entire set of possible branches have been populated, i.e. when the number of leaf nodes is $4^n$ where n is the number of branching levels (depth) in the tree. Alternatively, the tree structure 200 may be reset when the stochastic structure of the leaf contents shifts, as may be measured using principal component analysis.

Further still, any of a number of mechanisms can be employed for implementing control over the freshness of data in the tree structure. For example, the mean time between updates can be a criterion for deactivation, or the intensity variance, which if too large may indicate that the returns are simply receiver noise. A complete purge can be performed each frame or arbitrarily, but if we are indexing the previous n frames, a partial purging can be done each frame to remove all old (stale) leaf nodes (where "old" here means exceeding some time threshold). Otherwise if we don't remove or deactivate "stale" leaf nodes, they would be included in subsequent searches. A practitioner may decide not to purge from memory inactive leaf nodes of previously stored ladar return data. In so doing, the practitioner can both streamline search (deactivated nodes are removed from the tree reducing search complexity) while simultaneously storing "stale" data that may resurface as useful later on. Suppose, for example, that a ladar-equipped car drives into a tunnel. The environment suddenly changes dramatically, what was sky is now suddenly filled with returns from the tunnel ceiling, etc. This sudden change in the environment may quickly result in useful data being deemed "stale". When the vehicle exits the tunnel, the environment will revert back to what it was before. Far better then, to "resurrect" the old "stale" data and update it, than start from scratch. For example the road surface, trees or lack thereof, weather conditions which reflect return intensity etc. will likely be highly correlated with conditions extant before entering the tunnel.

The power of quad tree indexing with respect to adaptive ladar system control becomes even stronger when the ladar return data is sparse, which is the general case for an intelligent and agile dynamic range point ladar system that employs compressive sensing/scanning. In such a case, as shown by FIGS. 2B-2D discussed below, the quad tree index and lookups are greatly simplified, in a way that direct search is not.

Figure 2B:
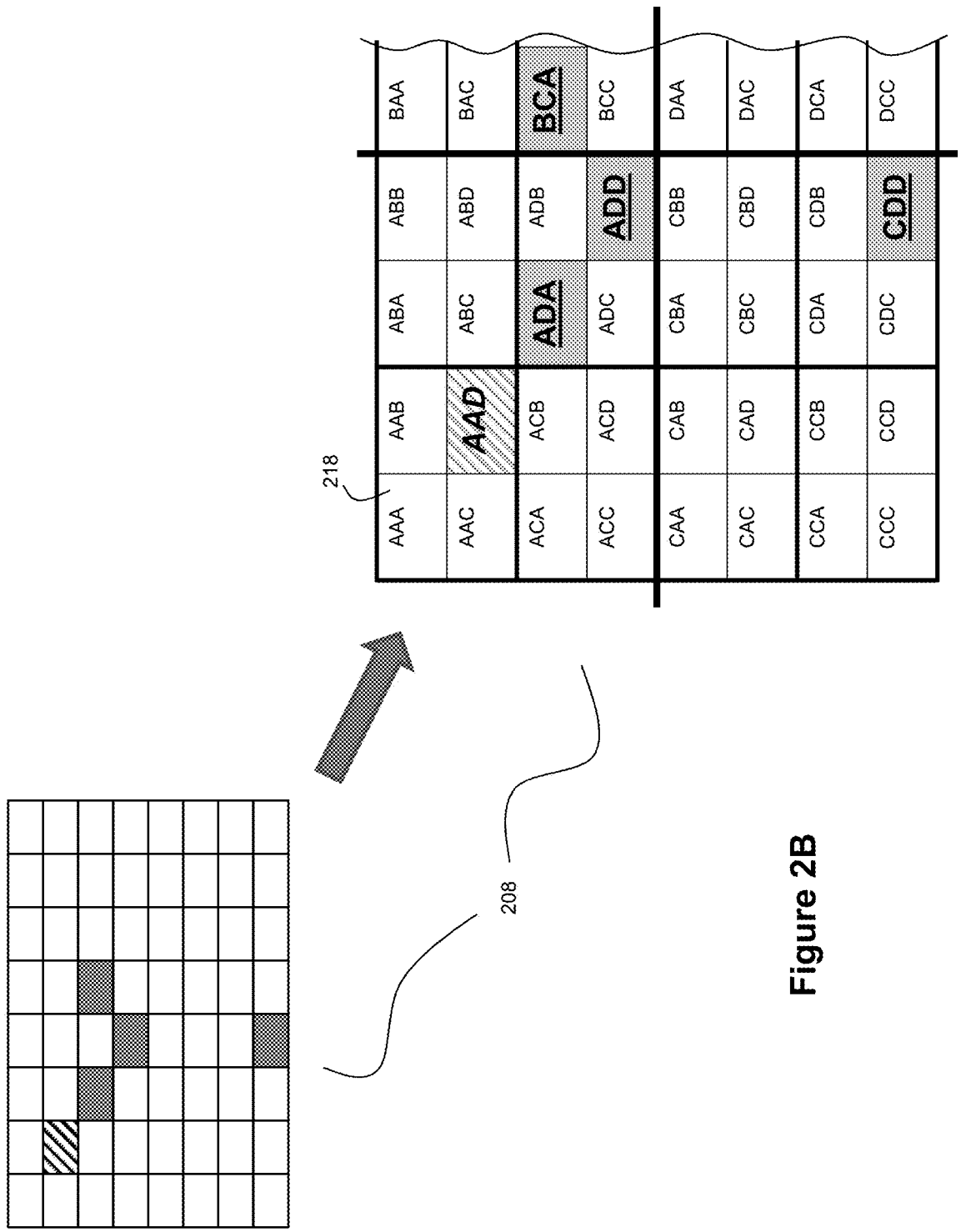
FIG. 2B shows an example where various leaf nodes of a quad tree index are populated with prior ladar return data.

FIG. 2B shows an example where various leaf nodes of a quad tree index are populated with prior ladar return data. In an example embodiment where the ladar transmitter 102 employs compressive sensing/scanning, the ladar frames detected by the ladar system 100 can be characterized as sparse arrays because only a subset of the range points within the frame's field of view will have been targeted with ladar pulses. Thus, in example embodiments, each ladar frame sensed by the ladar system 100 may have only a relatively small number of range points from which ladar reflections/returns are received. This means that the quad tree index will have a relatively sparse number of leaf nodes that are populated with prior ladar return data for a given frame. An example of this is shown by FIG. 2B where the 8×8 array of leaf nodes in level 208 is populated with only 4 prior ladar returns (as denoted by the solidly shaded cells in FIG. 2B). If a new ladar pulse shot is to target the range point shown in FIG. 2B by cross-hatching, the ladar system 100 will then apply the FIG. 1B process flow to find the leaf nodes that are nearby the to-be-targeted range point. Depending on the radius R used to define the vicinity around the targeted range point that qualifies as nearby, there will be a maximum of 4 potential ladar returns to access and consider at steps 154 and 156 of the FIG. 1B process flow. We will step through this training set selection process, and streamlining (pruning) of branches below.

Figure 2C:
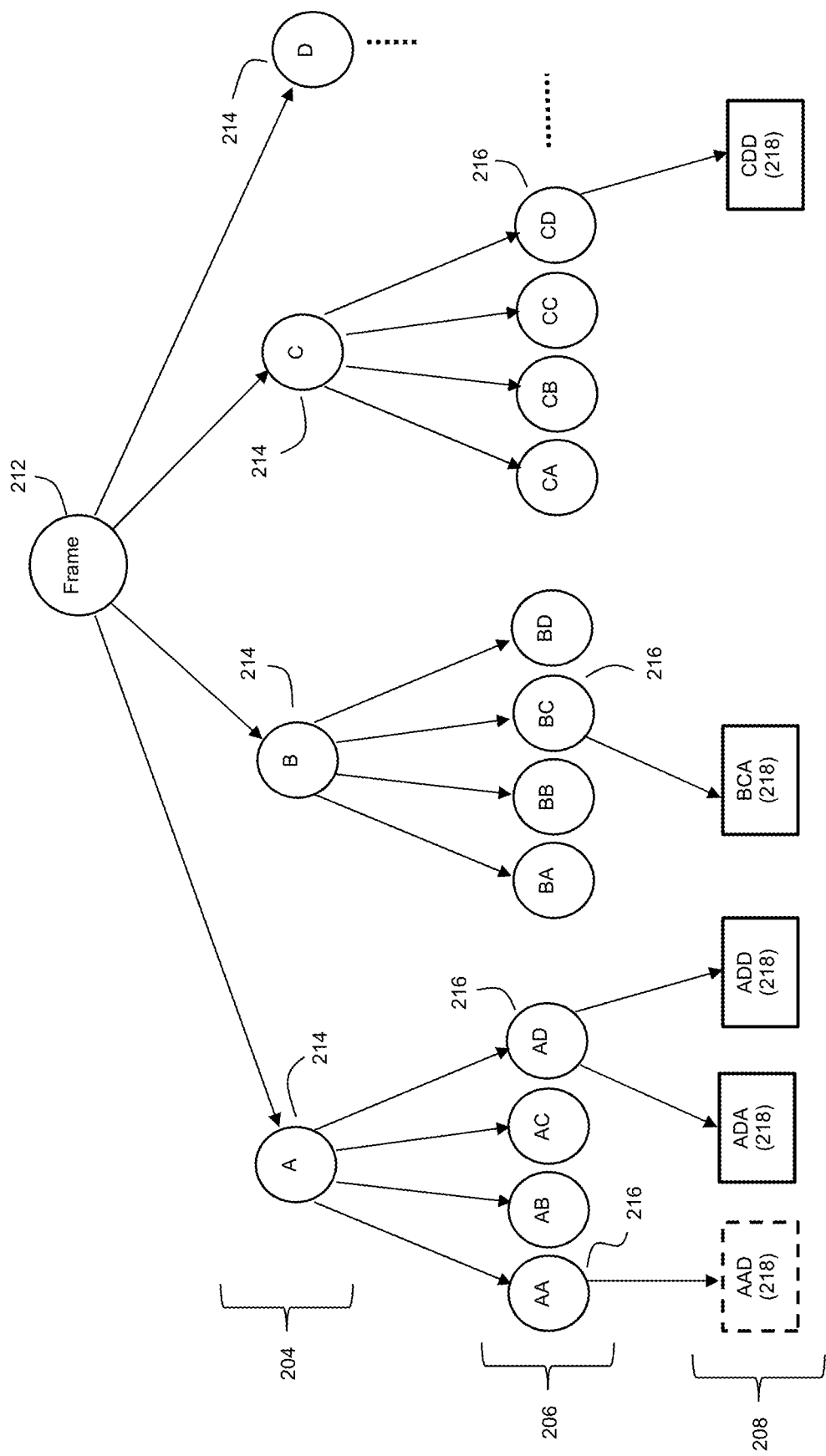
FIGS. 2C and 2D show example tree views of the quad tree index of FIG. 2B.
Figure 2D:
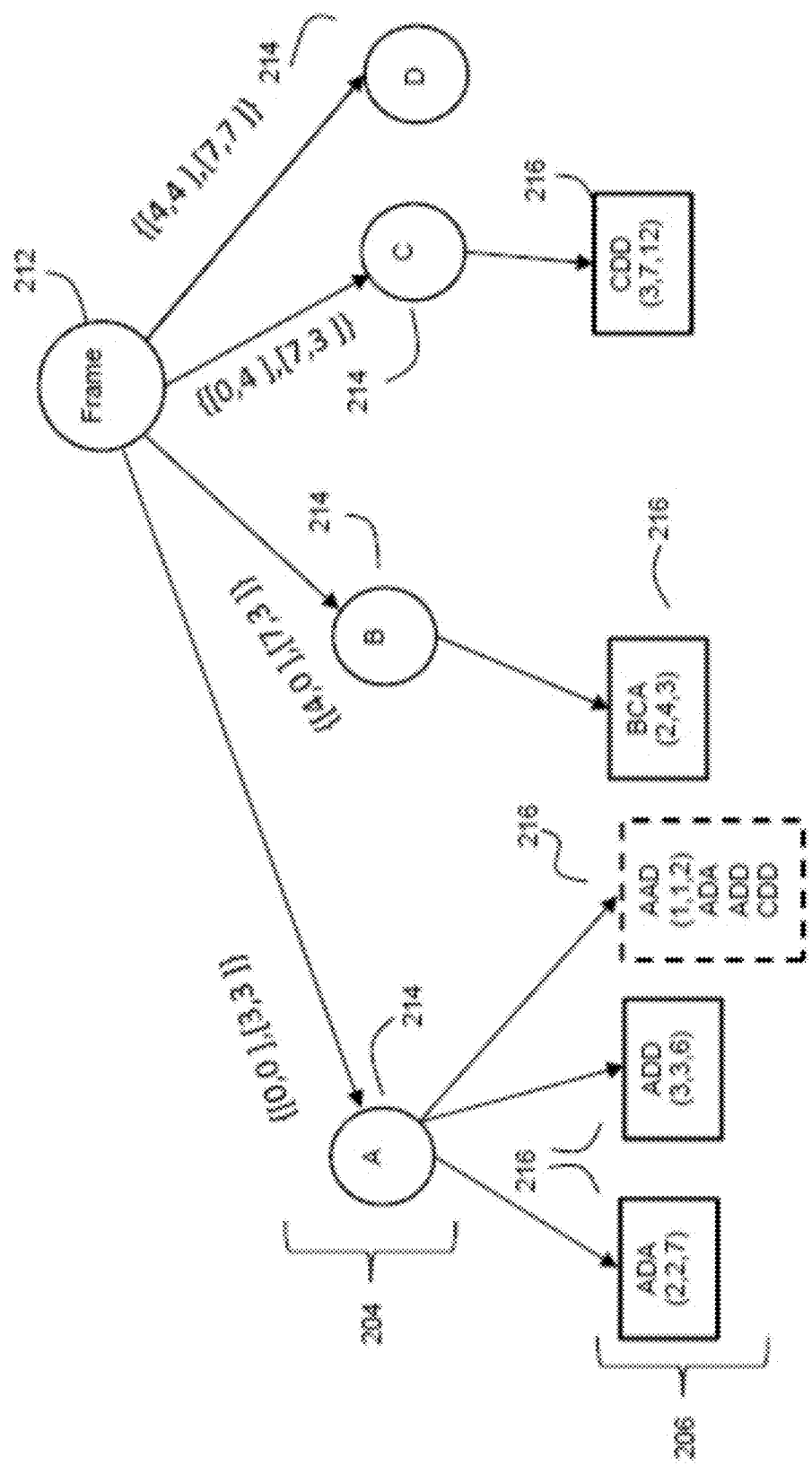

In the example of FIGS. 2A-2D, a labeling convention can be applied to the tree structure such that the 4 cells 214 in level 204 can be labeled A, B, C, and D with cell A being in the upper left corner and then the other cells being labeled in alphabetical order in a top down and left to right direction from the upper left corner. This means that the upper right cell will be labeled B, the lower left cell will be labeled C, and the lower right cell will be labeled D. Moving down to the next level 206, the cells 216 will be labeled by pairs of letters where the first character in the pair sequence is inherited from the spatially relevant cell 214 in the higher level 204 and where the second character in the pair sequence uses the same rotation of ABCD values. Accordingly, the upper left cell 216 in level 206 would be labeled AA, while the lower right cell 216 in level 206 would be labeled DD. Moving down to level 208, the cells 218 will be labeled by tuples of letters, where the first character in the sequence is inherited from the spatially relevant cell 214 in level 204, where the second character in the sequence is inherited from the spatially relevant cell 216 in level 206, and where the third character in the pair sequence uses the same rotation of ABCD values. Accordingly, the upper left cell 218 in level 208 would be labeled AAA, while the lower left cell 218 in level 208 would be labeled CCC. With this labeling convention, FIG. 2B shows that leaf nodes ADA, ADD, BCA, and CDD each contain prior ladar return data. FIG. 2B also shows that the next range point to be targeted with a ladar pulse shot corresponds to leaf node AAD. FIG. 2C provides a tree view of this quad tree index, which shows the spatial relationship arising from the branching in levels 204 and 206 down to the leaf nodes 218 in level 208. From FIG. 2C, it can be seen that leaf nodes ADA and ADD are both under branch node A together with leaf node AAD that is to be targeted with a new ladar pulse shot. Furthermore, leaf nodes ADA and ADD are also both under branch node AD (although leaf node AAD is not under branch node AD, and is instead under branch node AA). Furthermore, leaf node BCA falls under branch nodes BC and B respectively; while leaf node CDD falls under branch nodes CD and C respectively. It should be understood that the labeling of FIGS. 2B and 2C can be conceptual; we shall now see that only a small section of the cells need be used and that the depth of branches can be vastly reduced if desired by a practitioner.

But before we begin, note that in a "pure play" quad tree index, such as is defined here in an example embodiment, the branch nodes only provide (i) pointers to their (first generation) children (where such children may be leaf or branch nodes), and (ii) the bounding box corners that define the contour which encompasses all leaf nodes that are descendants of the subject branch node. The role of the bounding box coordinates is that it allows the quad tree index to be searched to determine if a given leaf node is within a distance R of any leaf in the tree, quickly discarding the need for any further testing below the branch node. This is why the logarithm term appears in the complexity search model. By design, the area defined by all branch nodes in the tree are always such that their union is the entire ladar field of view.

However, it should be understood that a practitioner may choose to store additional information in branch nodes if desired. For example, a practitioner may find it desirable to store data in branch nodes that aggregates all of the return data for active leaf nodes under that branch node. In this way, if the search for nearby returns would encompass all of the active leaf nodes under a given branch node, then the lookup process would need to only access the subject branch node to obtain aggregated return data (rather than requiring additional traversal deeper into the tree structure down to the active leaf nodes under that branch node). In terms of choosing what information to include in branch nodes, the trade off of what information (if any) of the shot returns to store in branches close to the root will surrounds issues such as pre-processing, memory, versus recurring execution time per query.

We are now poised to discuss an example embodiment for using quad trees in connection with the example of FIG. 2A. Define the x,y origin as the upper left hand corner, growing from top to bottom and left to right. Assume small angles so x,y can be viewed as distance without polar conversion. Each box is assumed to be one unit in angular distance; so AAD, the sample we need training data for, has x=1,y=1. Likewise, the training samples have spatial coordinates ADA, x=2,y=2,ADD, x=3,y=3, BCA, x=4,y=2, CDD,x=3, y=7. Next assume the range measured for the new shot, and old shots, are, respectively, (2, 7, 6, 3, 12), and finally that the search region is R=4.

Now the goal in a quad tree is to have (up to) 4 children for each branch node, where the children can themselves be either branch nodes or leaf nodes. Recall we define the bounding box where all the branch node children "live" as well. The boxes can be rectangles so that we keep the search geometry simple. FIG. 2D shows a quad tree graph for the data set in FIGS. 2C and 2D including all the data stored at graph nodes for completeness.

The root of the tree is 212, which encompasses all data that has been collected in a frame, or set of frames. The root is the "foundation" of the tree and does not per se possess any information, it is just an initialization step. The first set of nodes, 204, below the tree are all branch nodes, labeled A,B,C,D as per FIGS. 2A-2C. These nodes contain as content, 214, the x,y pairs describing the bounding regions for the addressable leaf nodes (which are not necessarily active leafs). For example, D is the lower right quadrant whose edges are x=4,y=4, and x=7,y=7, as shown with {[ ], [ ]} notation in FIG. 2D. Now we begin by finding out which branch nodes in layer 204 are within 3 of the new shot AAD. Note that each test requires only two multiplies, for a total of 8 multiplies. In our case, ADA,ADD,BCA satisfy this and are added to the elements of the leaf node for AAD. For ease of illustration, we show leaf nodes as squares and branch nodes as circles.

In our case, all leaf nodes are at the second layer in the tree, 206, with entries, 216, that consist of x,y,range triplets (for training nodes), and after the search the current node includes the training set pointers as well. Whether or not to delete these after interpolation is for the user to decide.

It should be evident that FIG. 2D shows a vast reduction in memory as well as search time as a result of the quad tree approach. The example embodiment that we describe here of a quad tree is a root-to-leaf search scheme. The opposite direction search can also be done, and is useful if a non-exhaustive, partial, search of training set data is sufficient. Many other variants are possible, such as minimum "Manhattan distance" (sum of absolute errors in x and y), which minimizes multiplications, best m nearest neighbors training etc.

Adaptive Shot Energy Control Using Spatial Index of Prior Ladar Return Data

Figure 3A:
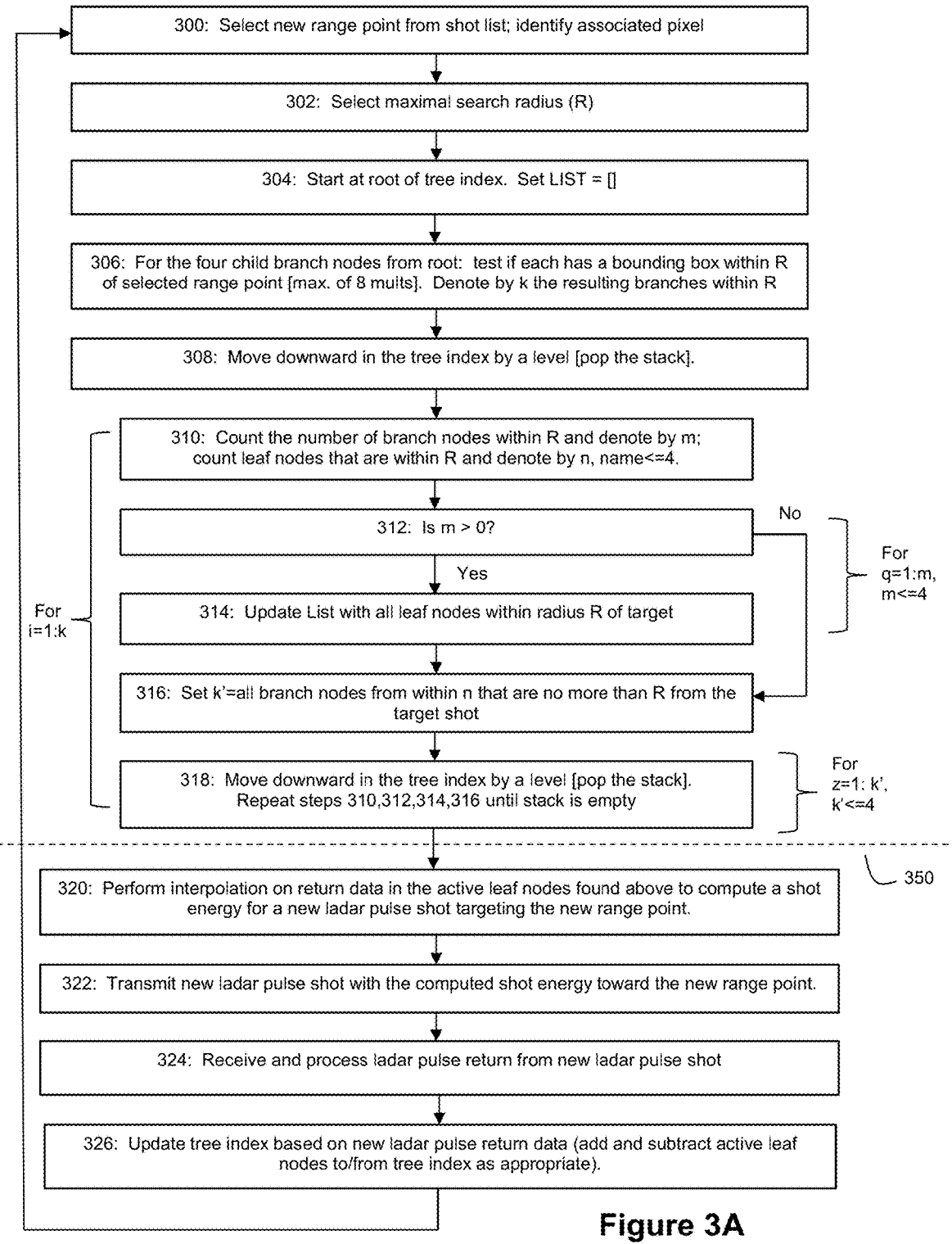
FIG. 3A shows an example process flow that leverages a spatial index of prior ladar return data to define a shot energy with respect to a new ladar pulse shot.

FIG. 3A shows an example process flow that leverages a spatial index such as the quad tree index of FIG. 2D to define a shot energy with respect to a new ladar pulse shot. With reference to FIG. 3A, the operations performed above dashed line 350 are focused on finding the ladar return data within the spatial index that will be used as the training set to control the adaptiveness of the system. FIG. 3B shows example pseudo-code for the portions of FIG. 3A above dashed line 350. The operations performed below dashed line 350 are focused on how the training set is applied to adapt the system (via shot energy interpolation in this example). In this example, the range points and their corresponding coordinates in the field of view can be referred to as pixels. At step 300, a processor selects a new range point to be targeted from the shot list. The associated pixel for this range point is then identified (e.g., a given azimuth and elevation pair for that range point). With reference to the running example from FIGS. 2B-2D, step 300 can identify AAD as the range point to be targeted.

At step 302, the processor selects the maximal search radius, R, that is used to define the vicinity of range points that are considered "nearby" the targeted range point identified at step 300. This value for R can be expressed as a count of pixels or cells around the targeted range point (e.g., 3 pixels/cells). However, it should be understood that other units could be chosen. For purposes of explanation with the running example of FIGS. 2B-2D, an R value of 3 pixels/cells will be used. The value of R defines the largest distance away from the targeted range point for which the ladar system will look for previous shots to use when evaluating how the ladar system should be adaptively controlled with respect to the targeted range point. Loosely speaking, in an example embodiment, the value of R can define the angular extent that the intensity in the image is deemed to be "smooth" to quadratic order.

Further still, it should be understood that for some embodiments a practitioner may choose to employ a fixed value of R for all ladar pulse shots; while for other embodiments, a practitioner may choose to adjust the value for R in certain circumstances. The size of "R" can vary as a function of the types of objects, the density of objects, and/or likelihood of presence of objects, that may be known to exist in the field of view. For example, it may be desirable to controllably adjust the search radius on a shot-by-shot basis. As another example, the search radius can be controlled based on the type of object that is expected to be targeted by the new ladar pulse shot. Thus, the system expects the new ladar pulse shot to target a road surface, the ladar system can define the search radius accordingly. Given that the road surface is expected to exhibit a relatively smooth return over large distances, the ladar system may choose to set R to a relatively large value. But, if the returns indicate that an object may be present where the new ladar pulse is targeted, the system may want to reduce the size of R to account for a smaller area that the object might encompass. The choice of R presents a tradeoff involving speed, where the smaller R will result in faster results. There is another (largely) unrelated tradeoff, namely the rate of change anticipated for the intensity of the scene. The sky will be unlikely to change in intensity much, while a road with a reflective sign post will vary quite a bit. Since the system can adjust based on the energy expended, the system can largely minimize any artifacts from intensity fluctuation in the image. After selecting R, the search begins at the tree root (step 304).

At step 306, the processor tests to see if the new range point is within a distance R of the children of the root node ($1^{st}$ generation descendants which, by design, are branch nodes). Then, for all k such children the search continues as follows. The search drops, at step 308, to the second level of child nodes, which may be either leaf or branch nodes. Of these four nodes the search examines which nodes, if any, are with radius R of the targeted range point, and labels these as leaf or branch nodes, numbered as n,m (step 310). Next, one tests whether m>0 (step 312); and if so adds these leafs to the list of training cells (step 314). At step 316, the process sets k' equal to the number that represents all of the branch nodes within n that are no more than R from the new range point. Next, at step 318, the processor moves downward in the tree index by a level and repeats steps 310, 312, 314, and 316 until the stack is empty.

With reference to FIGS. 2B-2D and an R value of 3, step 306 would first result in finding branch node A because branch A lies within zero distance of targeted range point AAD (since AAD is inside the upper left square region of the field of view (FOV)). Then (moving left to right), the search would identify that branch nodes B, C lie within a distance 3 from AAD, but branch D does not.

The process flow then proceeds to step 308. At step 308, the processor moves upward in the spatial index to the next higher level branch (the grandchild branch one generation removed from the root). Then, these nodes are inspected (step 310), which in the FIGS. 2B-2D example reveals they are all leaf nodes, so step 312 flags "yes", and step 314 is executed. At step 314, leaf nodes with prior ladar return data that are also within the search radius R are added to the training list. With reference to FIGS. 2B-2D and an R value of 3, step 314 would result in finding, ADA, ADD, BCA, which are then added to leaf node contents for AAD.

The process flow then proceeds to step 316. At step 316, the processor continues the search, 318, down all k' branch nodes found in 310 until all leaf nodes have been accessed. With reference to FIGS. 2B-2D and an R value of 3, step 318 would result in a determination that there are no more leaf nodes that fall within an R value of 3 (see FIG. 2B), i.e. k'=0. Accordingly, the process flow would then advance the process flow to step 320.

At step 320, the processor performs interpolation on the prior ladar return data in the active leaf nodes identified at steps 310 and 318 to compute a shot energy for the new ladar pulse shot that will target the subject range point. Accordingly, with reference to FIGS. 2B-2D and an R value of 3, step 320 would result in the processor using the ladar return data stored by leaf nodes ADA, ADD, and BCA to compute a shot energy for the ladar pulse shot that will target range point AAD. Examples of techniques for performing this interpolation and shot energy computation are discussed below.

At step 322, the ladar transmitter 102 transmits the new ladar pulse shot toward the targeted range point, where the ladar transmitter 102 controls the laser source so that the new ladar pulse shot has the shot energy computed at step 320. The laser source of the ladar system can have adjustable control settings for charge time and average power, and these parameters can be controlled to define the shot energy. With reference to FIGS. 2B-2D and a scanning ladar transmitter 102 that employs compressive scanning as described in the above-referenced and incorporated patent applications, this operation involves the ladar transmitter 102 firing the new ladar pulse shot with the computed shot energy toward range point AAD when the scanning mirrors are positioned so that the ladar transmitter 102 targets range point AAD.

At step 324, the ladar receiver 104 then receives and processes a ladar pulse reflection corresponding to the ladar pulse shot fired at step 322. As part of this operation, the ladar system 100 is able to extract data from the reflection such as the intensity of the reflection and the range to the targeted range point. The ladar system can also, if desired, extract data from the reflection such as the shape of the pulse return, the average noise level, and (when available) polarization. This data can then serve as the ladar pulse return data for the range point targeted by step 322. Techniques for receiving and processing ladar pulse reflections are described in the above-referenced and incorporated patent applications. With reference to FIGS. 2B-2D, step 324 would operate to generate ladar pulse return data for range point AAD.

At step 326, the processor updates the spatial index based on the new ladar pulse return data obtained at step 324. As part of this step, the processor can populate a leaf node linked to the subject range point with the new ladar pulse return data. With reference to FIGS. 2B-2D, step 326 would operate to populate a leaf node for AAD with the ladar pulse return data received at step 324 for AAD. This operation effectively adds leaf node AAD to the pool of active leaf nodes for the spatial index. As part of step 326, the processor can also deactivate leaf nodes that would now be considered to hold "stale" data (if applicable). For example, as noted above, it may be desirable to tag leaf nodes that hold "stale" ladar return data with an inactive flag or otherwise purge the leaf node of data so that it will no longer influence step 320. In doing so, the system prunes the search process by effectively subtracting such a stale leaf node from the search process (although the leaf node itself may stay as part of the tree structure 200).

After step 326, the process flow would then return to step 300 to repeat itself with respect to the next shot on the shot list. It should be noted that for this repeat pass, if (continuing with the reference example from FIGS. 2B-2D) the next ladar pulse shot was targeted toward range point ACD (and where R is still 3), this next iteration of the FIG. 3A process flow would also use the ladar pulse return data stored in the leaf node for AAD when deciding on the appropriate amount of shot energy to use when lasing range point ACD. In this fashion, the ladar system 100 can adaptively control its shot energy on a shot-by-shot basis while continuing to take into consideration the prior ladar return data of nearby pixels in the coordinate space. However, such adaptation need not necessarily be performed on a shot-by-shot basis if desired by a practitioner. For example, one might adapt pulse energy shot-to-shot if the system discovers that an object is known to be in a certain area (from either prior ladar frames, or a video camera, or a map), or adapt not all until and if an object is detected, or a blending of the above, with different regions being adapted (or not) based on analysis of received pulse returns.

Figure 4:
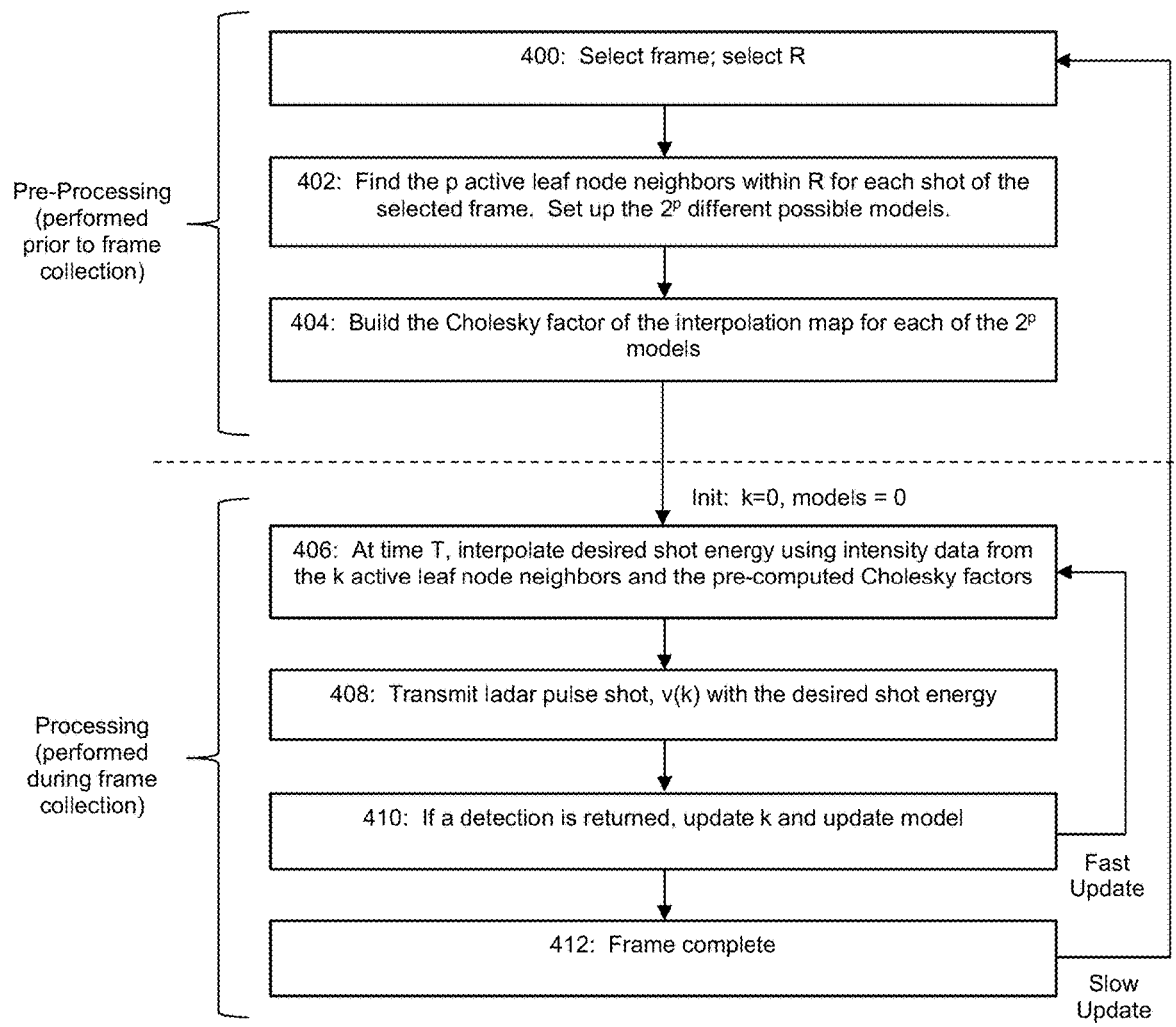
FIG. 4 shows an example process flow that describes how interpolation can be performed on prior ladar return data from the spatial index to compute a desired shot energy for a new shot.

FIG. 4 shows an example process flow that describes how shot energy for a new ladar pulse shot can be computed in relation to step 320 of FIG. 3A. In the example of FIG. 4, it will be assumed that only the return intensities for prior ladar returns is used to influence shot energy selection; but other information can be included as well if desired by a practitioner. For example, one might include information about the dynamic scene evolution based on ladar vehicle motion. Here an energy manager can explicitly track whether the azimuth and elevation of previous shots corresponds to aspects of the current scene that is still within the ladar system's field of view. The closer the prior returns are located to the edge of the scene, as it is found moving towards the rear of the vehicle, the shorter the period of time that one would then retain that data. One might also include information about the rate of change of the scene around the ladar return pixel. This rate of change could be used to determine how quickly to update the shot energy. For example, straight ahead the scene changes very slowly, whereas at the edges the scene changes much faster. Instead of doing a nearest neighbor search at x,y one could then do a nearest neighbor search at say (x-v_x dt), (y-v_y dt) in order to adapt based on the scene that has moved to this location vs the scene that was at this location. This is one of many examples of how the embodiment of spatial indexes for ladar transmission control can be configured. In addition to motion of the vehicle equipped with ladar, atmospheric attenuation variation can also be a factor.

In the example of FIG. 4, steps 400-404 can be preprocessing steps that are performed prior to interrogation of the subject range point by the ladar pulse shot for which the shot energy is to be computed; and steps 406-412 are steps that can be performed "live" by the processor as part of steps 320 et seq. from FIG. 3A.

For purposes of explanation, and continuing with the example of FIGS. 2B-2D, we will assume the intensity of the 3 leaf nodes that are active and within R of the subject range point are 0.1, 0.4, and 0.2 (in terms of arbitrary units for purposes of illustration). It should be understood that the system can also scale these intensities deterministically by range if desired. Range scaling can be useful if (1) the ladar image is expected to extend over a large range extent and (2) limited interpolation samples are available, such as at the beginning of a frame and/or after quad tree reset, because range scaling will help remove/reduce the signal attenuation artifact effects at longer ranges. A practitioner may also augment the procedure by modifying the scan radius to include a time lag between each active leaf and the anticipated shot time. Also, other modes of active leaf measurement could be used. For example, if the system has super-resolution enhanced steradian estimates, this can be applied to the interpolation. In the following we assume that the beam spacing, in both azimuth and elevation, denoted by $\theta$ satisfies $\theta=1$ for notational expedience, and we assume super-resolved azimuth with respective entries 1,2,2.5, and that the range to the new voxel is double that of previous voxels, all assumed equal in range (or range normalized as discussed in above parenthesis), with super-resolved azimuth of 0.1 for AAD.

At step 400, a processor selects a given frame, which may take the form of a defined frame (e.g., a foveation frame) as described in the above-referenced and incorporated patent applications. The processor can also select a value for the search radius R at step 400. Once the frame has been selected, the system can determine the ladar pulse shots that are planned to be taken for the various range points within the selected frame.

At step 402, the processor finds all of the active leaf node neighbors that are within R of the targeted range point location for each shot of the selected frame. The count of these active leaf node neighbors, which is a function of returns from lidar shots fired, can be denoted as p. Let us denote by $p_{\{max\}}$ the largest set of possible training samples available. We can find the value of $p_{\{max\}}$ in advance, by simply counting how many of the range points in the shot list are within a distance R. This is a maximum for p, clearly, since training sets are defined by active leafs, and active leafs can only appear when there is a shot list associated with said nodes. We note that when the training set is sparse, that is few possible leaf nodes are available within a fixed distance R, a speedup is available in exchange for memory (and we will revisit this speedup opportunity shortly).

The maximum degrees of freedom (DOFs) is 6. The degrees of freedom in this context defines the number of variables in the model. Since we are proposing here a second order polynomial these terms are, consecutively: {constant, Az, El, {Az×El}, $Az^2$, $El^2$}. In other words we have the intensity vs shot energy model:

$$\text{shot(energy)} = c_0 + c_1 * Az + c_2 * El + c_3 Az * El + c_4 * Az^2 + c_5 * El^2 \tag{1}$$

The idea is we use past data to find the $c_0 \ldots c_5$ terms and then for any new position we plug in Azimuth (Az) and Elevation (El) and we get the shot energy. The constant is the "floor" of the intensity. For a road surface, for example, we would expect very little azimuth (Az) and elevation (El) dependence so the constant term would be large and the other terms small. If we are looking toward the ground we would expect azimuth to change quickly (at least at the road boundary) so that the $c_1$ term is big.

This use of the model in (1) with training as outlined below effectively provides a proportional feedback loop, where the input is scaled based on the previous measurement (Direct Markov process) or measurements (Markovian State space process). However, instead of simply feeding back to the same pixel (which may not be fired again for some time), the input (training set) is fed to all neighboring pixels about to fire (which may not have been fired for some time). Due to the multiplicity of neighbors feeding back to any pixel (and spatial variance), we can interpolate the inputs (the optimal shot energies), regardless of if or when these pixels fired. In this manner we have an asynchronous quasi-Markovian, or discrete event system model, which is well-suited to a dynamic, agile, ladar system.

At step 402, the processor can choose the form of the interpolation model so that the DOFs are less than or equal to the number of potential training leafs, p, bounded by $p_{\{max\}}$. So, for example, if the value of p is 6 or greater, the system can use the full set of the parameter list above; but if p<6, the system will choose a subset of the above parameter list so there are not more parameters than samples. For example if p=1, we only have one model parameter, and $p_{\{max\}}$ possible ways in which this single return/active-leaf can arise, and for p=2 we have 2 parameters and $$\binom{p}{2}$$

potential active leafs, etc.

In total there will be $$\sum_{i=1}^{p_{\{max\}}} \binom{p}{i} = 2^{p_{\{max\}}} - 1$$

candidate models. For sufficiently small $p_{\{max\}}$ we can choose these models in advance to reduce downstream computation and latency. This is especially attractive when we have a background frame, and a pop up region of interest. In such a case the background pattern serves as a training set for many shots, allowing us to amortize the precomputation cost across many shots. To give a numerical example, let $p_{\{max\}}$=3 for some range point Q in the list. This means that there are at most 3 training samples within range R of Q. Denote the three training sample points as R,S,T. Then the possible training sets are reduced to {R},{S},{T},{RS}, {RT},{ST},{RST}, a total of 7=$2^3$−1 possibilities. For training sets with a single entry we use a constant model, $c_0$ so in (1) shot energy ∝ intensity in {R} or {S} or {T} respectively. For two entries in the training set we pick a constant plus azimuth model, yielding $c_1$, in which case we fit a line to {RS},{RT},{ST}, and for {RST} a quadratic. Denote by $\theta_{apply}$ the location of the range point in azimuth for the upcoming shot, and in the two entry case the training entries as {a,b} and the training positions in azimuth as $\theta_a$, $\theta_b$, then we have:

$$\text{Shot energy}(\theta_{apply}) \propto c_0 + c_1 \theta_{apply}, c_0 = \frac{a+b}{2}, c_1 = \frac{a*\theta_a + b*\theta_b}{\theta_a + \theta_b}.$$

For the constant and linear examples thus far there is a savings of three divisions and three multiplies using pre-indexing with the tree structure 200, in the forming of the $c_1 \theta_{apply}$ term but behold: For the three sample case we have training entries {a,b,c} and we can proceed (using Vandermonde matrix properties) as follows, Set:

$$\text{energy} = c_0 + c_1 \theta_{apply} + c_2 \theta_{apply}^2 \text{ which}$$

simplifies [computationally albeit not symbolically] to energy =

$$R\left[\frac{-(\theta_b + \theta_c)\theta_{apply}}{(\theta_a - \theta_b)(\theta_a - \theta_c)} + \frac{\theta_b \theta_c R}{(\theta_a - \theta_b)(\theta_a - \theta_c)} + \frac{\theta_{apply}^2}{(\theta_a - \theta_b)(\theta_a - \theta_c)}\right] +$$

$$S\left[\frac{(\theta_a + \theta_c)\theta_{apply}}{(\theta_a - \theta_b)(\theta_b - \theta_c)} - \frac{\theta_a \theta_c}{(\theta_a - \theta_b)(\theta_b - \theta_c)} - \frac{\theta_{apply}^2}{(\theta_a - \theta_b)(\theta_b - \theta_c)}\right] +$$

$$T\left[\frac{\theta_a \theta_b}{(\theta_a - \theta_c)(\theta_b - \theta_c)} - \frac{(\theta_a + \theta_b)\theta_{apply}}{(\theta_a - \theta_c)(\theta_b - \theta_c)} + \frac{\theta_{apply}^2}{(\theta_b - \theta_c)(\theta_a - \theta_c)}\right]$$

Notice that all the terms in brackets can be precomputed in advance. The energy evaluation now only takes three multiples, versus about 16 multiplies/divides. In terms of multiplies and divides the net savings with precomputing is then 11 versus 22 multiplies if done directly.

To take a specific case of how the above processing might be employed, let us assume we choose to reset the quad tree at each frame, and we have a fixed distance R that we scan for neighbors to build our set point. At the beginning of a frame there will be no prior shots, so we must use an initial condition for the first shot (or update from the last frame before resetting to zero the leaf contents). Assuming that we scan in a roughly left-right up-down fashion we will see that after a few initial conditions we have enough neighboring cells to obtain interpolation from the current frame. To begin we will have a low model order, starting with just a constant, then adding azimuth, then elevation, then the cross term, then finally quadratic terms. By precomputing the Cholesky factor we can keep the interpolation latency low enough to have updates within a frame. Of course this works best if the range point list is configured so that there tend to be numerous points within a region of radius R, and that these points are collected quasi-monotonically in time. This will be the case for a raster scan, foviated patterns, and most uniform random patterns.

For each model, the processor sets up and solves the regression problem the coefficients in equation (1) above. We denote the right hand side row vector by $b^t$ and the left hand row vector by $c^t$ where t denotes transpose. The solution for the regression equation A c≈b in Euclidean norm is:

$$c = (AA^t)^{-1} Ab. \quad (2)$$

Here b is the vector of prior data c is the vector of coefficients in (2), and A is the model matrix. (The practitioner will notice A would be Vandermonde if the sole cross term Az*El vanishes.)

For the case of (2) with only one parameter other than the constant term (which we denote by $\theta_0$) we can express this, for a random, representative choice of data b as:

$$[c_0 \; \theta_0] A \approx b, b \equiv [.1 \; .4 \; .2], A = \begin{bmatrix} 1 & 1 & 1 \\ 1 & 2 & \frac{5}{2} \end{bmatrix} c_0 = .05, \theta_0 = .1 \quad (3)$$

Note that the matrix A is independent of the intensity measured on prior returns and depends only on spatial structure of range points. This is the feature that allows us to precompute this factor, as demonstrated in the "toy" R,S,T example discussed above.

At step 404, the processor finds the Cholesky factor of the interpolation map for each of the $2^p$ models. For example, at step 404, the processor finds the Cholesky factor of $AA^T$:

$$L = \begin{bmatrix} 1.7321 & 0 \\ 3.1754 & 1.08 \end{bmatrix}$$

The system has now exhausted all that it can do a priori. Once the ladar system begins taking shots, two new pieces of the puzzle will emerge. The first is that the system will know if a pulse reflection is detected on each shot. If yes, then k, the number of model nodes that are active, which is initially set to zero, will be updated, for each of the possible node to which the shot is a child. Second, the system will get an intensity return if a pulse reflection is detected. The range points with returns for these p shots defines which of the $2^p$ nodes are active and therefore which model to use for interpolation.

The system can now begin to execute the shot list. At step 406, the processor (at time T) interpolates the desired shot energy using intensity data from the k active leaf node neighbors and the pre-computed Cholesky factors. With our running example from above, step 406 can compute the a posteriori optimal shot energy as:

energy=(0.05+0.1*0.1)/2=0.035

In terms of the overall system parameters we have:

A posteriori optimal energy=shot energy out*intensity set point/return intensity.

This energy allotment scheme can be seen to be valid/ efficacious in practice as follows: when the anticipated return intensity is low we need more energy. The intensity set point is the dimensionless scaling for the energy output from prior collections which adjusts for return intensity. This is akin to a traditional proportional feedback loop, where the input is scaled based on the previous measurement. However, instead of simply feeding back to the same pixel (which may not be fired again for some time), this input is fed to all neighboring pixels about to fire (which may not have been fired for some time). Due to the multiplicity of neighbors feeding back to any pixel (and spatial variance), we interpolate the inputs (the optimal shot energies).

The computational expediency of this solution is predicated by the relatively few comparisons in FIG. 2A. Suppose we have a radius such that the maximum depth we need to search is R. Next assume that a given active leaf node is uniform across this space. Let $r=\log_4(R)$. Using Bernoulli statistics, and Bayes' law, we find that the average search count for p active leaf/voxels is found to be:

$$p \sum_{i=0,...,r} \frac{1}{2^r} \approx r = p\log_4(R).$$

The linear equations in equation (3) are solvable using, the Cholesky scheme, of computational complexity $$\frac{p^3}{6}.$$

Using the fact that A is independent of the ladar returns, we can precompute A, and indeed $(A^TA)^{-1}A^T$, for every scheduled shot in the frame, for every model order. We can further reduce complexity by expressing $(AA^t)$ as $LL^t$ where L is the lower triangular Cholesky factor. This allows us to solve equations involving $(AA^t)^{-1}=L^{-t}L^{-1}$ by double back solving at a cost of only $p^2$ operations. If DOF and intensity samples are equal in quantity, then $(AA^t)^{-1}A^T$ is square and can be expressed as a lower times an upper triangular matrix against resulting in $p^2$ operations. This speed up allows for microsecond-scale update rates, in firmware or hardware implementations. For example, of the speedup, one might have a 3 usec update rate ladar system (~330,000 KHz shot rate), with a 300 m range extent, leading to 2 usec for the last pulse return, giving only 1 usec before the next shot is taken on average. With 6 shots used for interpolation of a six DOF model, the complexity is about 36 operations, which can be easily met with a 100 M flop device. With a quad tree index, the firmware or hardware is needed more for data transfer than raw operation counts. Without the quad tree index, a single sort across a 1 M voxel addressable point cloud would involve 1,000 comparisons per 3 us, thereby stressing the limits of most portable low cost general purpose computers, and this is without the frequently needed further complexity of retaining data over multiple frames. With a quad tree index, and R=16, each search now requires only 16 comparisons per 3 us.

At step 408, the ladar system transmits the ladar pulse shot toward the targeted range point (e.g., AAD) with the shot energy computed at step 406. If the ladar system detects a return from this ladar pulse shot, the ladar system updates the value for k and also updates the interpolation model (step 410). Specifically the size of c grows and A has an added column. As is the case whenever a return is obtained, the tree is updated as well. So long as there are additional shots in the shot list for the frame, the process flow can return to step 406 and repeat for the next shot on the shot list. However, once all of the shots for the subject frame have been completed (step 412), the process flow can return to step 400 to select the next frame.

While FIG. 4 describes an example process flow for computing the shot energy based on an interpolation of the intensities of nearby prior ladar return intensities, it should be understood that other techniques could be used. As discussed previously, the choice of technique involves the trade of precomputation in exchange for less recurrent cost. Whether one favors the former or the latter depends on how fast one expects the tree to be updated, or reset/reinitiated, as well as how sparse we expect it to be. A technique that minimizes precomputation is to rather build the data matrix A from scratch, and solve equation (3) from scratch every time the shot energy is updated. This has the advantage that no Cholesky factor needs to be stored or updated, but recurring costs are now higher.

Furthermore, as noted above, the spatial index can be expanded to dimensions greater than 2 if desired by a practitioner, in which case additional search features such as range could be included in the decision-making about which range points are deemed "nearby" a subject range point. Likewise, an extension from a quadratic form of interpolation to a multinomial (higher dimensional) interpolation can also be employed if desired.

Adaptive Interference Mitigation Using Spatial Index of Prior Ladar Return Data Furthermore, the ladar system can adaptively control aspects of its operations other than shot energy based on the spatial index of prior ladar return data. For example, it can adaptively mitigate various forms of interference using the spatial index. Examples of interference mitigation can include adaptively adjusting control settings of the ladar receiver 104 (e.g., controlling receiver sensitivity via thresholds and the like) and detecting/avoiding occlusions or other non-targeting conditions via adaptive shot selection. A reason to adapt based on interference is that the laser can vary in efficiency with temperature. Furthermore, fiber lasers have hysteresis, meaning that the efficiency, specifically maximum pulse energy available, depends on shot demands in the recent past.

As noted above, receiver noise can be adaptively mitigated using the spatial index. Examples of ladar receiver control settings that a practitioner may choose to adaptively control using the techniques described herein may include time-to-digital conversion (TDC) thresholds and spacings (if the ladar receiver 104 employs TDC to obtain range information from ladar pulse returns) and analog-to-digital conversion (ADC) thresholds (if the ladar receiver 104 employs ADC to obtain range information from ladar pulse returns). Examples of a suitable ladar receiver 104 are described in the above-referenced and incorporated patent applications. To process a signal that represents incident light on a photodetector array in the ladar receiver 104, receiver circuitry will attempt to detect the presence of ladar pulse reflections in the received signal. To support these operations, ADC and/or TDC circuitry can be employed. A tunable parameter for such a ladar receiver are the thresholds used by such TDC and/or ADC circuitry to detect the presence of ladar pulse reflections. In example embodiments, the ladar system can adaptively control these thresholds based on the spatial index of prior ladar return data so that the ladar receiver 104 can more effectively detect new ladar pulse returns.

Additional potential sources of interference are other fielded and environmentally present ladar systems. The spatial index can be used to detect such interference (which will tend to impact multiple beams due to Lambertian scattering of the other-vehicle-borne ladar). Identifying the presence of such other ladar systems, and using interpolation as discussed above to locate such interference can assist in interference mitigation. In addition to the fact that one can desensitize the ladar system through threshold changes, interference can be reduced by shifting the transmit beam direction to retain target illumination but reduce exposure to interference. Such an approach is particularly effective when the shift is sub-diffraction limited, i.e. a micro-offset (see FIG. 10B discussed below). This can further be enhanced through interferometric enhanced processing. Note we discuss here ladar interference, but passive clutter interference can also be mitigated with the above techniques.

Figure 5A:
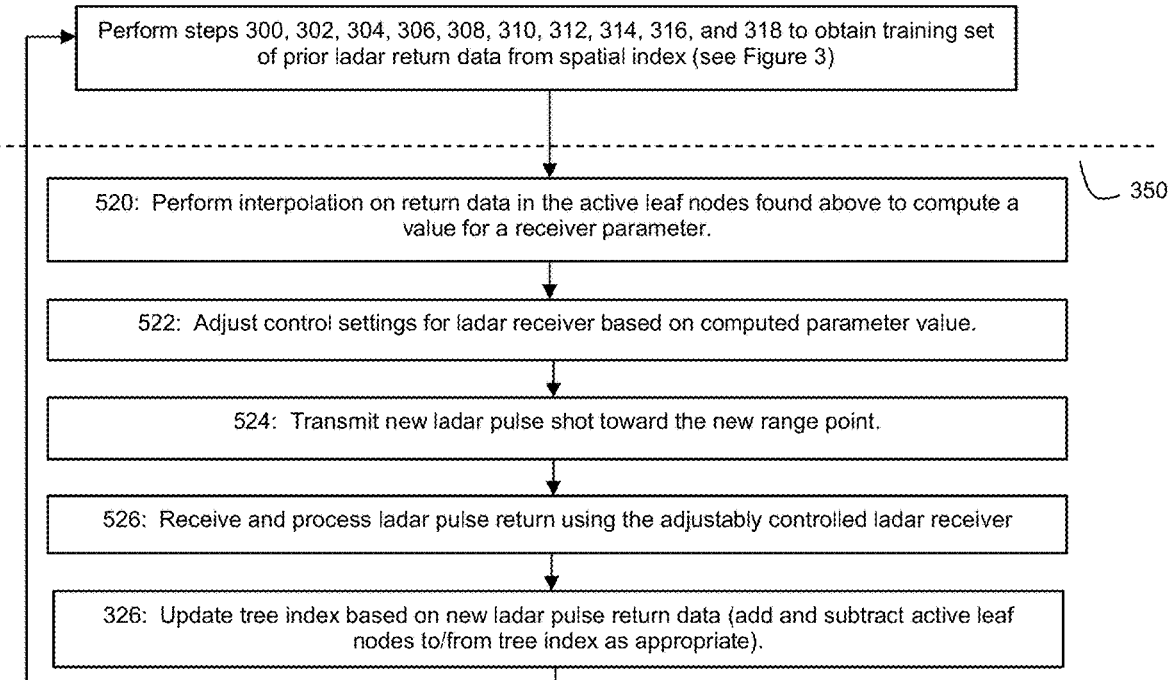
FIGS. 5A and 5B shows example process flows that leverage a spatial index of prior ladar return data to adjust a control setting for a ladar receiver with respect to processing a ladar return with respect to a new ladar pulse shot.

FIG. 5A shows an example process flow where the ladar system adaptively controls the sensitivity or other control settings of the ladar receiver 104 using the spatial index of prior ladar return data. In the FIG. 5A process flow, steps 300-318 can proceed as described in connection with FIG. 3A.

After all of the nearby active leaf nodes have been identified and accessed after step 318, the FIG. 5A process flow can proceed to step 520. At step 520, the processor performs interpolation on the return data in the active nearby leaf nodes to compute a parameter value for the ladar receiver 104. For example, when adaptively controlling an ADC threshold, the spatial index can store statistically-aggregated noise levels (such as average, e.g., root mean squared, RMS noise levels) in active leaf nodes, and set the new shot detection threshold for the ladar receiver 104 to be a fixed multiple of this value, based on interpolation of radial proximate voxel returns. If desired, a practitioner can further expand this to create adaptive range-dependent thresholds, using octagon trees (octrees for short) to encode range if a highly granular dependency is desired. As an example, it may be desirable for the system to break the voxel returns into several range segments (e.g., 100 range segments) extending from a fourfold quad tree index which encodes azimuth and elevation, to an eight-fold octree index which encodes azimuth, elevation and range. Similar interpolation techniques can be used to compute an adaptive TDC threshold, although it is expected that RMS noise levels would not be available a priori and must thusly be computed on the fly, by numerically averaging buffered TDCs (such as available from Texas Instruments), adding to recurrent computational costs and TDC hardware costs.

At step 522, the processor adjusts the relevant control settings for the ladar receiver 104 based on the parameter value computed at step 520. For example, if a register in the ladar receiver 104 holds a threshold value to use for comparison operations by the TDC and/or ADC circuitry, the processor can write the adaptively computed threshold value from step 520 into this register. In doing so, the ladar receiver 104 is then ready to receive and process a new ladar shot return.

At step 524, the ladar transmitter 102 transmits a new ladar pulse shot toward the targeted range point. At step 526, the ladar pulse reflection from the targeted range point is received by the ladar receiver 104. The ladar receiver 104 then processes the received reflection using the adjustably controlled parameter value from step 522 to obtain ladar return data for the current ladar pulse shot. As noted above, this can involve the ladar receiver using a threshold value from step 522 that is stored in a register of the ladar receiver 104 to influence the operation of TDC and/or ADC circuitry.

Thereafter, as noted above with reference to step 316 of FIG. 3A, the processor updates the spatial index with the newly obtained ladar return data (and it may also deactivate active leaf nodes from the spatial index as might be appropriate in view of any rules being used to maintain fresh ladar return data in the spatial index). The process flow can then return to step 300 for the next shot on the shot list.

The spatial index can be used to control any aspect of the receiver that may be spatially dependent. This can include maximum depth of range (once we hit the ground no pulses behind (under) the ground can be obtained, maximum signal return (which can be used to adjust dynamic range in the digital receiver), atmospheric attenuation (rain and fog can be angle dependent).

Figure 5B:
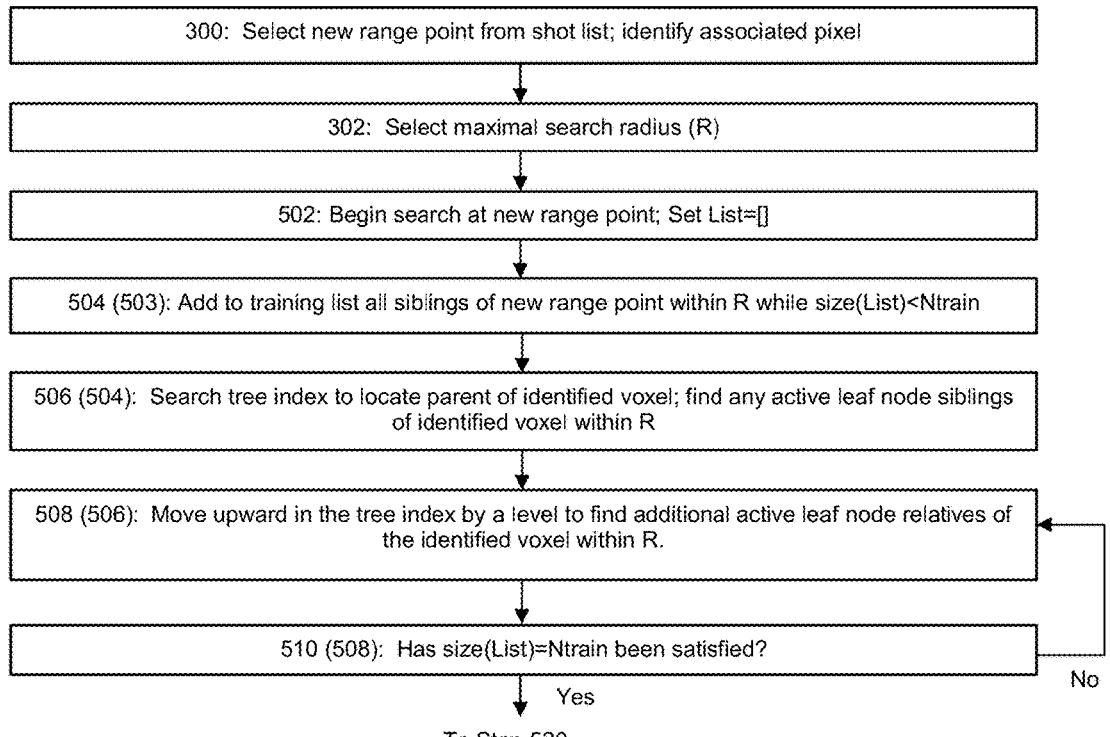

FIG. 5B shows an example process flow where the steps of collecting training data above dashed line 350 employ an alternate reverse search of the spatial index (from leaf node-to-root node). Such an alternate technique for searching the spatial index can be useful if the process flow only needs to find a fixed number of training samples. For an example implementation, to find nearest neighbors (NB for short), the processor can perform a top down search, from the new range point. The system can use a stack to keep track of the nodes that it wishes to explore. The processor can traverse only active branch nodes (which in turn lead to active leaf nodes) that also index a space within distance R from x, y. A node that satisfies both these conditions is pushed onto the stack. When a node is popped off the stack for consideration, the process repeats, checking all its children nodes for the above conditions; if the children are instead leaf nodes and pass the check, the processor has found a NB and can store that leafs index. By traversing the tree with this procedure, the processor finds NB leaf nodes of the targeted range point that are within the distance R of the targeted range point (which may include x, y if it is active), without exhaustive search, thereby saving computations over the tree searching techniques of FIGS. 3 and 5A.

For illustrative purposes for an example run of FIG. 5B, we set a fixed number of needed training samples, Ntrain, to Ntrain=2, and we set the value R=4. As in FIG. 3A, we begin with steps 300 and 302. Step 304 in FIG. 3A is now replaced in FIG. 5B with step 502, whereby we start the search at the new range point, and again as in FIG. 3A we initialize the training list to the empty set, [ ]. We assume for our example that the quad tree index has already been constructed, as in FIG. 2D, without AAD, the new target cell yet added. Next step 306 in FIG. 3A is replaced by 504, whereby we update the training list with all siblings of the new training cell that are within R of said cell. In our case, per FIGS. 2B-2D, step 504 results in ADA being added to the training set, as well as ADD. Since Ntrain=2 in this simple example, the process flow can be ended, thus using only 4 multiplies for the search and only accessing node A; whereas in FIG. 3A the process flow needed to access all of nodes A,B,C,D and further sub-branches. If Ntrain were larger than 2, we would need to move to step 506, to inspect siblings of the parent node of the targeted pixel, to test if they lie within the distance R. One continues thusly, down the stack, 508, until the list size equals the required value Ntrain, stage 510.

Accordingly, it should be understood that multiple techniques can be used for searching the spatial index to find nearby prior ladar return data. Furthermore, while the reverse search technique is described in FIG. 5B with reference to adaptive control of receiver parameters; it should be understood that the reverse search technique could also be applied to other forms of adaptive control (such as adaptive shot energy control with reference to steps 320 et seq., etc.).

Figure 6:
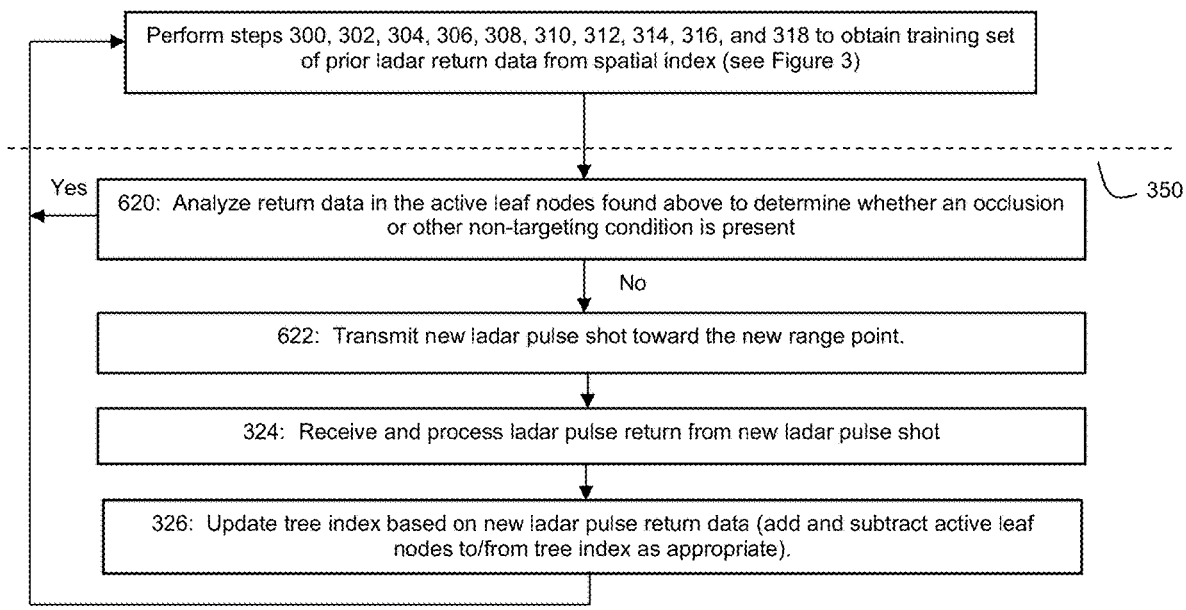
FIG. 6 shows an example process flow that leverages a spatial index of prior ladar return data to adjust shot selection for the ladar system.

FIG. 6 shows an example process flow where the ladar system adaptively adjusts its shot selection using the spatial index of prior ladar return data. Any of a number of reasons could arise where it may be desirable for the ladar system to depart from its planned, ordered targeting of ladar pulse shots. For example, there may be grime, dirt, mud, droplets, ice, insect debris, or other occlusions on the outside lens/scope of the ladar system such that the quality of signal reception over certain spatial regions of the ladar system's field of view is degraded. In such situations, it may be desirable to adjust the ladar pulse shot selection to "shoot around" the grime/dirt/occlusion. Thus, if there is an oily dirt speck on the outside lens that degrades the ability of the ladar system to send/receive with respect to pixels at locations CBA and CBC (see FIG. 2B), it may be desirable for the ladar system to replace a planned ladar pulse shot targeting location CBA with a ladar pulse shot that targets ADC (or some other location near CBA). Additional sources of noise or signal error could be faulty photodetector cells or lens cracks that would cause a particular region of the observed field of view to be obscured. As an example, such localized obscurants can be detected by identifying, for example, disproportionately low intensity returns that are relatively time-invariant, but persistent in azimuth and elevation. Although it should be understood that if the lens has material on it that reflects light back into the receiver, then a higher intensity might indicate obscurants.

Similarly, if the ladar system is able to learn that there are objects in the field of view that may become damaged if illuminated with ladar pulses (as determined from the prior ladar return data), the ladar system can adaptively adjust its shot schedule to shoot around such objects. Thus, if there is a nearby smart phone with a camera that could be damaged if irradiated with a ladar pulse shot, the ladar system can detect the presence of such a smart phone in the prior ladar return data using image classification techniques, and then make a decision to adaptively adjust the ladar pulse shot schedule to avoid irradiating the camera's detected location if necessary.

In another example where the ladar system is deployed in an autonomous vehicle used in outside environments (such as an automobile), it may be desirable to include wiper blades or the like to periodically clean the outside surface of the ladar system's optical system. In such instances, it is desirable to not illuminate the spatial regions in the field of view that would be blocked by the wiper blades when the wiper blades are in use. Thus, if the ladar system hits the wiper blade with a ladar pulse shot, the return data from that shot is expected to exhibit a large intensity magnitude (due to limited beam spreading and therefore limited energy dissipation) and extremely short range. Thus, the prior return data in the spatial index can be processed to detect whether a wiper blade is present in a particular region of the field of view, and the ladar system can adjust the shot schedule to avoid hitting the wiper blades, while minimizing beam offset. More perception/cognition-based adaptive shot selection schemes can be envisioned. For example, in heavy rain, the video can detect spray from tires, or wheel well spoilers on large trucks, and schedule shots so as to minimize spray from said objects. Note that techniques for shot timing for the avoidance of wiper blade retro direction can also be used to avoid retro directive returns from debris on the first surface of the transmit lens. Furthermore, the shot scheduler can be adjusted to fire immediately after the blade has crossed an area to be interrogated, since the lens is cleanest at the exact moment after the wiper has passed.

In the FIG. 6 process flow, steps 300-318 can proceed as described in connection with FIG. 3A. After all of the nearby active leaf nodes have been identified and accessed after step 318, the FIG. 6 process flow can proceed to step 620. At step 620, the processor performs analyzes the return data in the active nearby leaf nodes to determine whether an occlusion or other non-targeting condition is present in that spatial region (see the discussion above regarding examples instances where it may be desirable to adjust the shot schedule). An example of occlusion detection is to explore optical flow as the ladar-equipped car moves through a scene. Without occlusion objects detected at point A on a previous shot can be expected to appear at point B at a new shot, based on relative motion between said object and the ladar. If this second detect fails to appear over multiple trials, then an occlusion in likely to be the most plausible culprit.

If step 620 results in a conclusion by the processor that an occlusion or other non-targeting condition is present, the process flow returns to step 300 and a new ladar pulse shot is selected from the shot list. As part of this, the ladar shot that was avoided because of this branching may be returned to a later spot on the shot list. However, a practitioner may choose to employ other adjustments to the shot schedule. For example, the avoided ladar pulse shot could be dropped altogether. As another example, the avoided ladar pulse shot could be replaced with a different ladar pulse shot that targets a nearby location. If step 620 results in a conclusion by the processor that an occlusion or other non-targeting condition is not present, then the process flow proceeds to step 622.

At step 622, the ladar transmitter 102 transmits a new ladar pulse shot toward the targeted range point. At step 324, the ladar pulse reflection from the targeted range point is received by the ladar receiver 104. The ladar receiver 104 then processes the received reflection to obtain ladar return data for the current ladar pulse shot. If desired by a practitioner, the ladar receiver 104 could also be adaptively controlled based on the content of the spatial index as discussed in connection with FIGS. 5A and 5B. Thereafter, as noted above with reference to step 326 of FIG. 3A, the processor updates the spatial index with the newly obtained ladar return data (and it may also subtract active leaf nodes from the spatial index as might be appropriate in view of any rules being used to maintain fresh ladar return data in the spatial index). The process flow can then return to step 300 for the next shot on the shot list.

Furthermore, while FIG. 6 shows the tree searching technique of FIG. 3A being used to collect the training samples; it should be understood that other tree searching techniques could be used prior to step 620, such as the one described in FIG. 5B.

Figure 7:
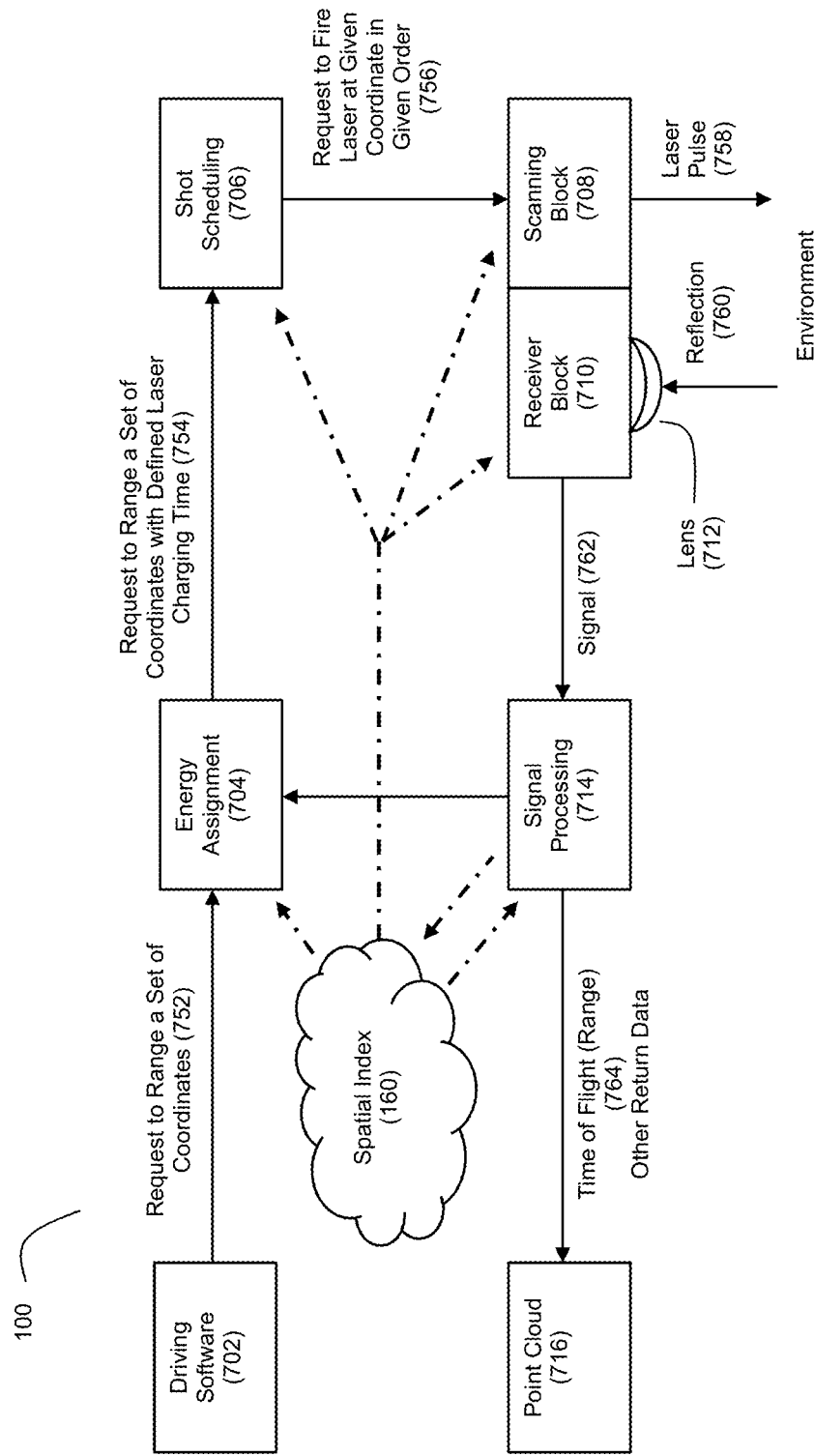
FIG. 7 shows an example system diagram for a ladar system that leverages a spatial index of prior ladar return data to control various parameter values with respect to a new ladar pulse shot.

FIG. 7 shows an example ladar system 100 that is capable of providing multiple types of adaptive control based on the spatial index 160. Spatial index 160 can store prior ladar return data in a tree structure such as a quad tree index as discussed above. Driving software 702 executed by a processor in the control system can generate requests 752 for ranging set of coordinates in the field of view. For example, these requests can be part of a shot list as discussed above and as described in the above-referenced and incorporated patent applications. The processor can then execute energy assignment logic 704 using the techniques discussed above in relation to FIG. 3A to determine how much energy to include with a given ladar pulse shot, where this determination is based on an analysis of nearby ladar return data for the subject shot as found in the spatial index 160. The result can be the shot requests being augments with a laser charging time (see 754) for each shot so that each shot can include a desired amount of energy. The shot scheduling logic 706 can request (756) to fire the laser at the targeted range point when the scanning mirrors target the subject range point and the laser is sufficiently charged. If desired, the shot scheduler can also leverage the spatial index 160 as discussed above in connection with FIG. 6 to determine whether any occlusions or other non-targeting conditions are present such that a given ladar shot should be rescheduled or dropped. For example, the shot scheduler 706 can be designed to accept vector interrupts based on information learned from the spatial index 160, where the vector interrupts would change the order or listing of shots that the scheduler 706 schedules.

Scanning block 708 can include the scanning mirrors and will direct the fired laser to the targeted range point. The scanning block 708 balances two conditions for pulse firing. It chooses the time to fire when the mirrors are in the correct azimuth and elevation position to hit the targeted range point. It also ensures, through information it collects from the spatial index 160, that the shot energy level is correct. However, these two criteria can be in conflict, since shot energy varies with the time between shots. The process of sorting out these criteria can be controlled by a shot scheduler (which can be referred to as a mangler). Since all shot energy levels impact the mangler, tight communication between the scan mirrors and the tree structure is desirable as shown by the lines connecting the scanning block 708 and the spatial index 160. The ladar pulse 758 will then propagate in the environment toward the targeted range point. A reflection 760 of that ladar pulse 758 can then be received by the receiver block 710 via lens 712. A photodetector array and associated circuitry in the receiver block 710 will then convert the reflection 760 into a signal 762 that is representative of the ladar pulse reflection 760. Signal processing circuitry 714 then processes signal 762 to extract the ladar pulse return data (e.g., range 764, intensity, etc.). This ladar pulse return data then gets added to the ladar point cloud 716 and spatial index 160. Examples of suitable embodiments for scanning block 708, receiver block 710, and signal processing circuitry 714 are disclosed in the above-referenced and incorporated patent applications.

As shown by FIG. 7, the spatial index 160 can be used by many of the various blocks in this system to adaptively improve their operations. As noted above, the spatial index 160 can be used by the energy assignment block 704 to adaptively control how much energy is assigned to each ladar pulse shot; and the spatial index 160 can also be used to influence shot scheduling block 706 as well as scanning block 708. Furthermore, the receiver block 710 can use the spatial index 710 to adaptively control its operations (e.g., amplifier gains for the amplifier circuitry that amplifies the signals detected by the photodetector array in receiver block 710 can be adaptively controlled based on the nearby prior ladar return data in the spatial index 160). Also, as noted above, the comparison/detection thresholds in the signal processing circuitry 714 can be adaptively controlled using the spatial index 160. Accordingly, it can be seen that the spatial index 160 of prior ladar return data can be used by ladar system 100 to adaptively control any of a number of different types of system operations. Furthermore, while the example of FIG. 7 shows the spatial index 160 being used to adaptively control several different types of operations; it should be understood that a practitioner may choose to implement the system 100 in a manner so that fewer than all of the processing blocks leverage the spatial index 160 if desired.

Figure 17:
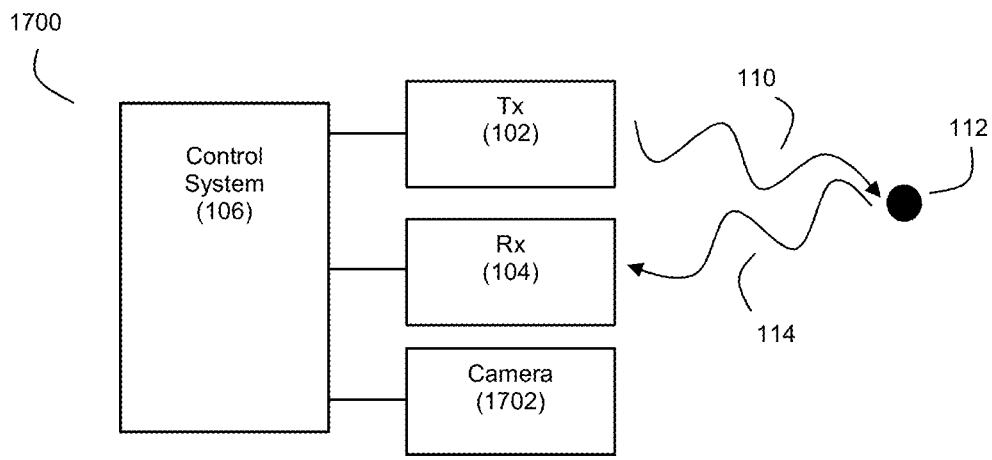
FIG. 17 shows an example ladar system that includes a camera.

Further still, with reference to FIG. 7, the ladar system 100 can also leverage the spatial index 160 to adjust settings of a camera (e.g., see camera 1702 in the example ladar system 1700 of FIG. 17) that is used by the system to support decision-making about which range points should be included on the requests 752 that make up the shot list. As explained in the above-referenced and incorporated patent applications, the ladar system 100 may employ a camera to assess which areas within the environmental scene are most salient for interrogation by ladar pulse shots. A practitioner may find it desirable to use the spatial index 160 to adaptively control various camera settings such as camera light settings. As a simple example, suppose at night (or in generally poor optical visibility), the ladar system detects a car that has low reflectivity (which is very likely then to be a black-painted car). The ladar system can then instruct the camera to retain the shutter open for longer than usual, in hopes of capturing a dim black object that otherwise is likely to be missed.

Example Use Cases

Figure 8:
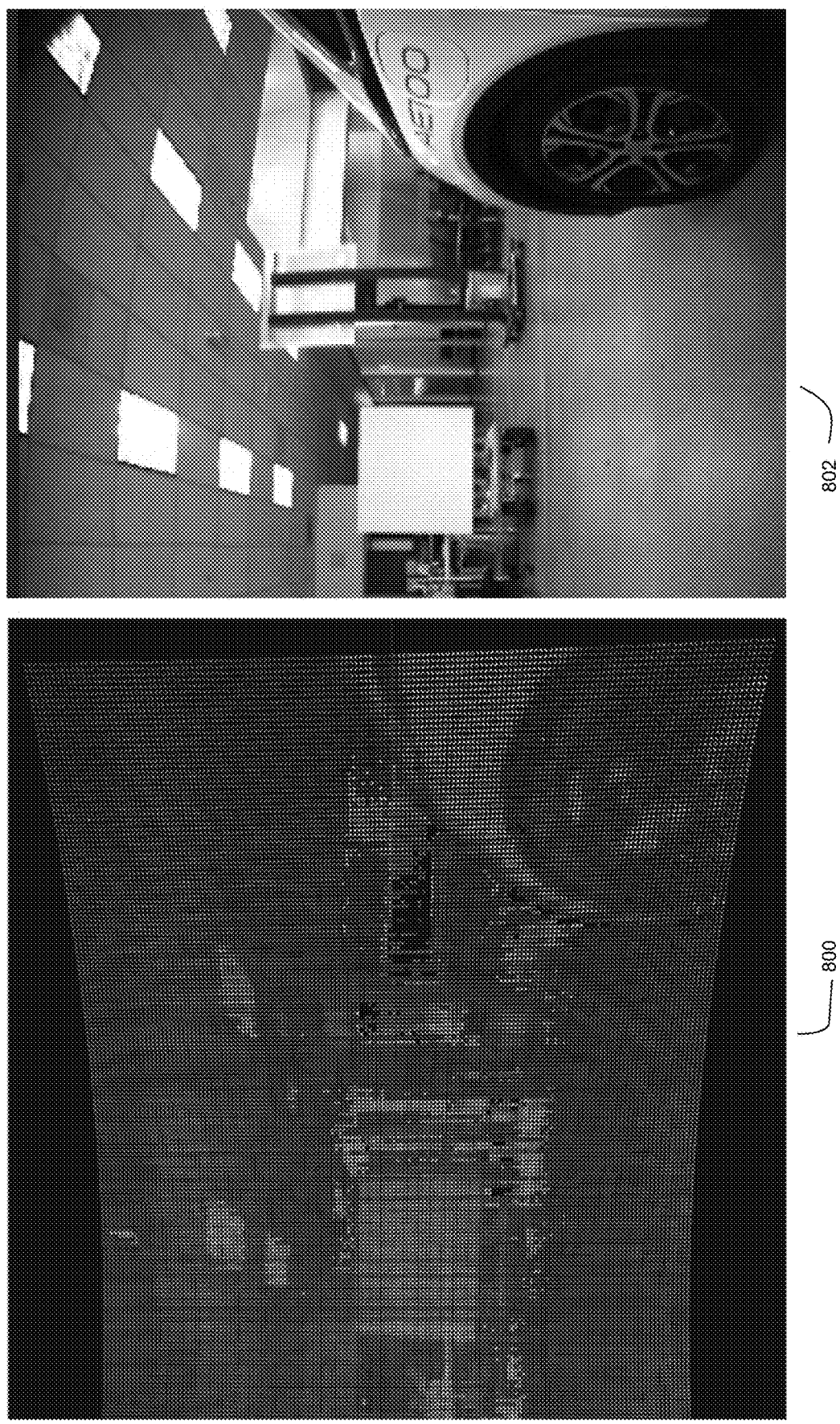
FIGS. 8 and 9 show examples of ladar images produced by non-adaptive and adaptive ladar systems respectively.

The left frame of FIG. 8 shows an example ladar return image 800 that is derived from a ladar system where no adaptive feedback control to achieve a more uniform illumination of the field of view is not employed. Image 800 is a 2D projected image of the intensity map in the ladar point cloud produced by a ladar system lacking adaptive feedback for a given frame. The right frame of FIG. 8 shows a camera image 802 of this same scene. As can be seen in ladar image 800, there are several vertical stripes that are present, and these stripes are not present in the environment. Instead, these stripes are due to artifacts in the ladar return data that arise, at least in part, due to non-uniformities in the shot energy of the transmitted ladar pulses.

Figure 9:
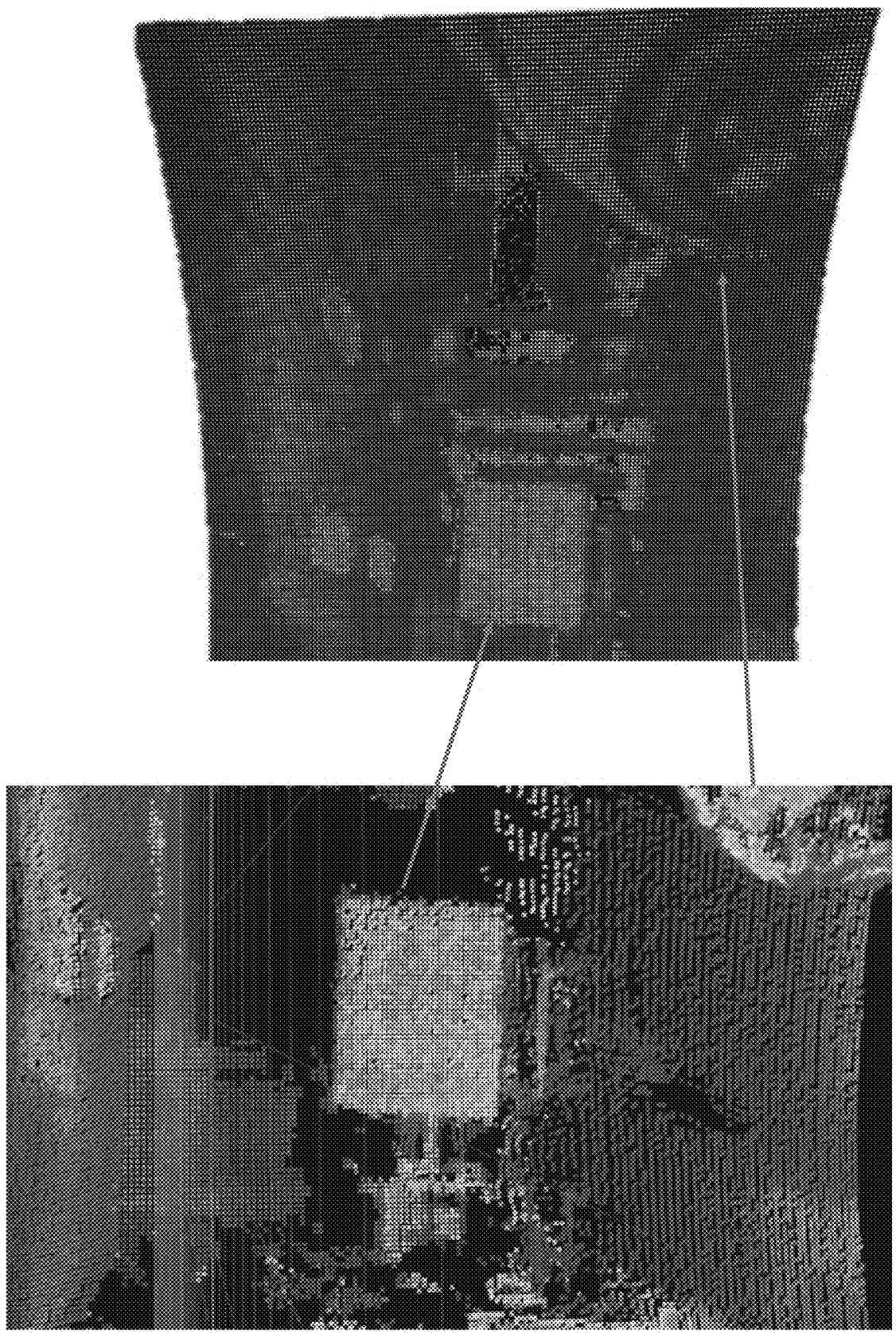

By contrast, FIG. 9 shows an intensity map, 3D perspective point cloud where the ladar system employs adaptive feedback control of shot energy using the spatial index 160 and FIG. 3A process flow (left frame) as well as a 2D image of this intensity map (right frame). As can be seen in FIG. 9, most artifacts are either gone or greatly suppressed; and the intra-object standard deviation (IOSD) has declined from an average of 20% to less than 4%. IOSD is a metric for intensity uniformity; it describes how much the image intensity changes when the object remains the same, in other words it separates variation in the ladar (sensor) from variation in the scene itself.

Figures 10A, 10B:
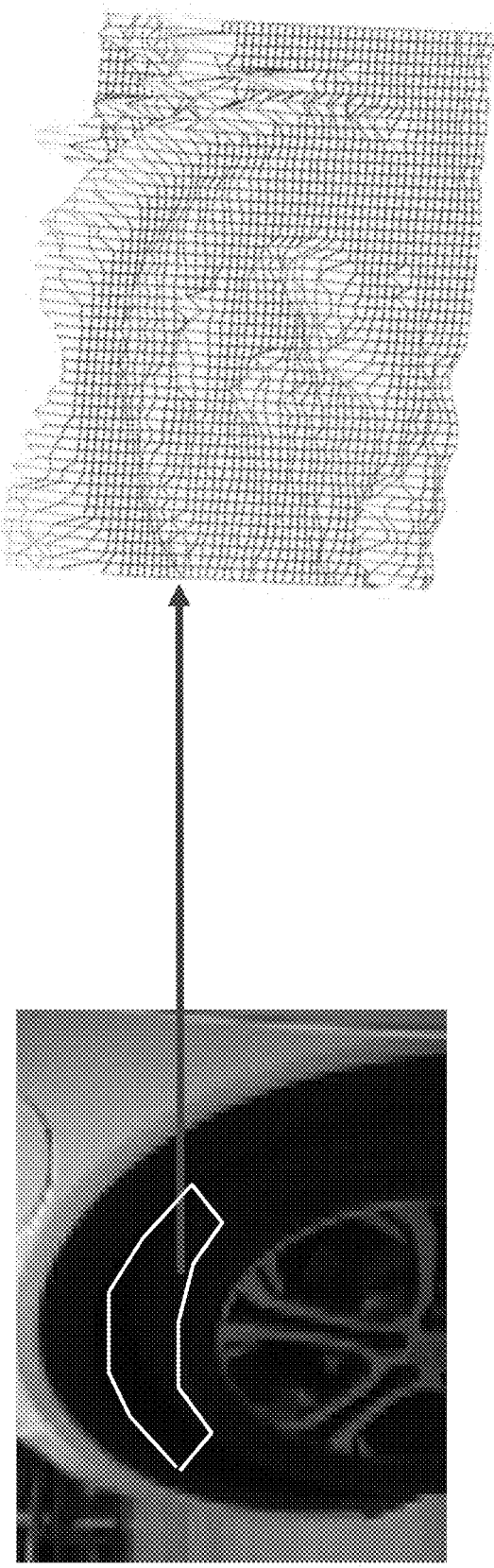
FIGS. 10A and 10B show example use cases for leveraging a spatial index of prior ladar return data to better detect objects in dark regions of the field of view.

FIG. 10A shows an example process flow where the ladar system employs adaptive feedback control of shot energy (using the spatial index 160 and FIG. 3A process flow) to construct a ladar intensity map of a road surface. Because the artifacts (e.g., striping effects as shown by FIG. 8 (left frame) can be reduced in such a road surface ladar intensity map, the system is able to better detect obstacles that may be present in the road. For example, the ambient intensity level in the ladar intensity map can be classified as corresponding to the road surface; and any contiguous regions of intensity that are lower than this ambient intensity can be detected and classified as a potential obstacle. Accordingly, a pedestrian with dark clothing or a tire tread in the road may be detected more reliably because of the reduced presence of noise artifacts in the ladar intensity map. FIG. 10B shows a camera image (left frame) and a corresponding ladar intensity map (right frame) of a car's wheel well, including tire. FIG. 10B specifically shows the intensity as a function of azimuth and elevation at the tire and wheel well. The intensity is low in the wheel well and higher at the tire. In this example, the range is not sufficiently accurate to assist in the tire versus well classification, so intensity was the best available feature. This range-insufficiency is also the case for tire debris on a roadway, but with examples embodiments described herein for adaptive shot energy management for intensity imaging, the intensity information in the returns can be used to better classify objects in the field of view, greatly contributing to improved safety. Accordingly, with the example of FIG. 10B, by employing adaptive feedback control of shot energy (using the spatial index 160 and FIG. 3A process flow), the ladar system is able to produce an intensity map with sufficient sensitivity to distinguish between dark areas of the camera image corresponding to the tire and the disproportionately darker tire rim wall.

Thus, with reference to FIGS. 10A and 10B, the spatial index can be used to normalize the intensities over a region in the field of view, and this can help reveal weak objects that would normally be non-distinguishable from background. For example, an object that is very dark in a ladar image is also likely to be dark in a camera image because the ladar wavelength is likely to be near the visible wavelength, which means dark object tend to react the same way in both a ladar view and camera view (e.g., black cars will appear dim in both ladar and camera views). Accordingly, in embodiments where the ladar system includes a camera, the spatial index can be used by the ladar system to smooth intensities over a neighborhood of range points in the field of view/coordinate space; and the ladar system can then control one or more camera settings as a result of the smoothed return intensities (and the objects that are newly revealed because of the smoothed intensities). For example, the camera can be instructed to increase exposure time to obtain a better image of the weak/dim object. In a powerful example embodiment relating to automobiles, the adaptive ladar system with camera can be used to better detect oncoming cars at farther distances. If there is a dark car relatively far away in front of the ladar system, it may be difficult for a conventional ladar system to distinguish such a faraway car from a dark road surface and/or classify the object as a car rather than, say, a tree branch. However, by using the spatial index to intelligently control camera settings so as to increase the effective exposure for producing camera images (e.g., using longer integration with digital cameras or changing the camera pupil mechanically), the adaptive ladar system can accurately classify the oncoming car at a farther distance, thereby greatly improving safety. Furthermore, since increasing the exposure slows down the camera frame rate (if the camera's aperture remains open longer, this means fewer frames per second), the ability of the ladar system to intelligently adapt its decision-making regarding when it is desirable that the ladar system increase camera exposure provides a good balance between speed and accurate detection.

FIG. 11 shows an example use case where the ladar system uses adaptive feedback based on the spatial index of prior ladar return data to reduce laser interference. At step 1, the ladar system contrasts the interpolation of return intensity over a neighborhood of nearby range points from the spatial index with the measured return for a range point in the subject neighborhood. If the contrast between the two is beyond a defined threshold, the system can conclude that laser interference is present. At step 2, the system can localize this interference by using a shot cluster around the subject range point while also adjusting the azimuth and elevation of the shot for that range point at a next frame to graze the interference gaze angle while still covering nearby potential objects. In simplified terms, one is using the fact that there is overlap between ladar beams to "peak" at the side of an object of interest similar to how one squints in sunlight to view an object by removing light from a bright object, even direct sunlight FIG. 12A shows an example use case for an application of adaptive shot energy control to reduce the damage risk to cell phones or other digital cameras. As noted above, the cameras that are included with cell phones can be susceptive to damage if irradiated with a ladar pulse shot because the small and thin photodetector arrays in such cameras may not be able to handle the energy within a ladar pulse shot (typically due to the thinness of the quantum wells in such cameras). Moreover, this danger exists for cell phone cameras and other digital cameras even if the laser light is well within the limit that this safe for human eyes. Accordingly, it is desirable for the ladar system to adapt its shot selection and/or otherwise control its shot energy to avoid dosing nearby digital cameras with too much light. In the context of autonomous vehicles, this risk can be considered in an example use case where the ladar-equipped autonomous vehicle is stopped at an intersection or in a parking lot and there are pedestrians standing nearby using their cell phones (perhaps even a curious pedestrian who is taking a photograph of the autonomous vehicle with his or her cell phone from close to the vehicle's ladar system). The adaptive ladar system described herein can leverage the spatial index to reduce the risk of damaging such a nearby cell phone.

Figure 12B:
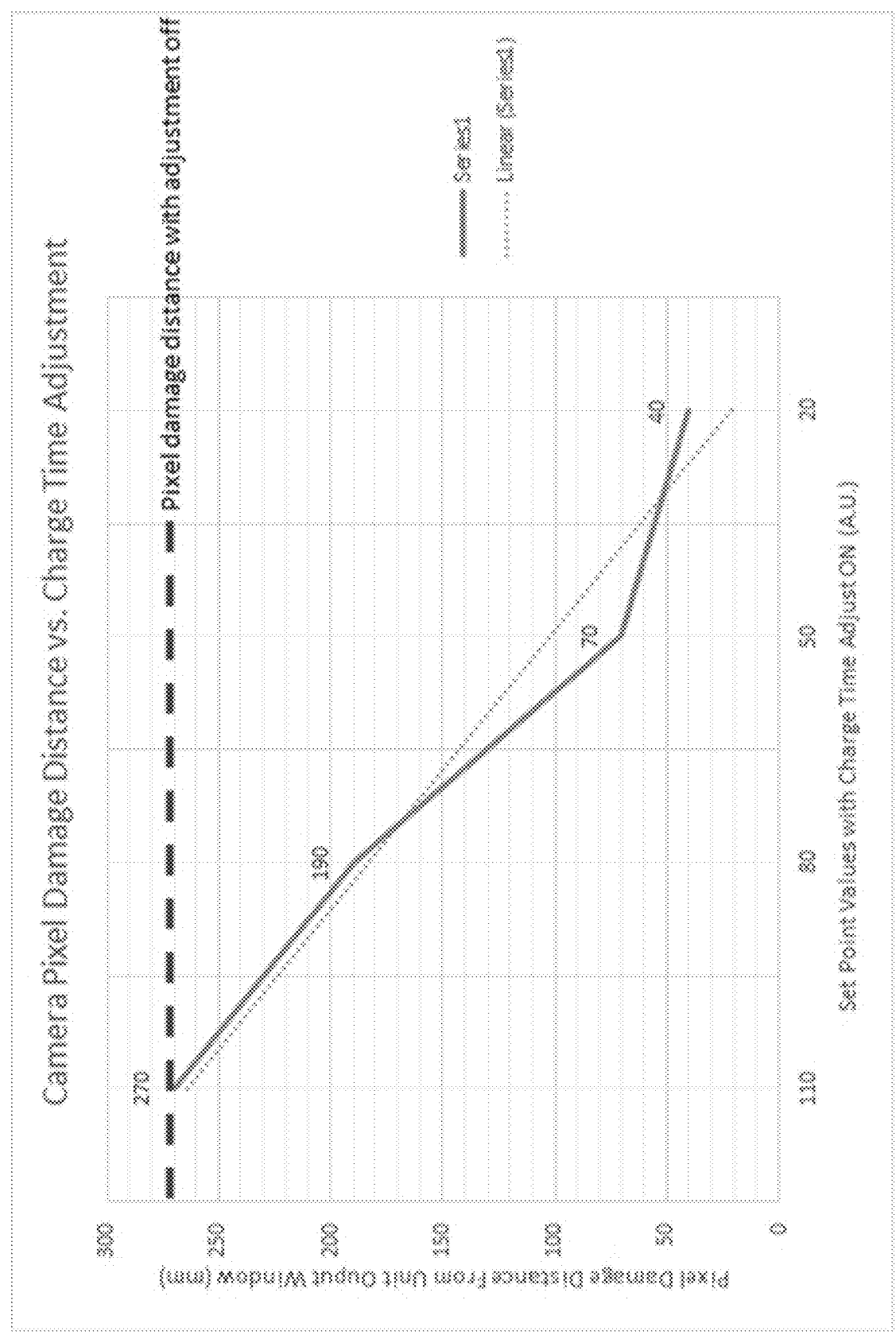
FIG. 12B is an example plot showing how camera damage can be affected by distance and shot energy.

In step 1 of FIG. 12A, the ladar system monitors the ladar return data from the spatial index for objects that are within a defined phone damage range (e.g., X feet). FIG. 12B shows a set of measurements for a cell phone (an iPhone 6 in this example) with respect to a ladar system (an AEye development system (AE90) in this example) that quantifies camera pixel damage distance versus charge time adjustment for ladar shots. The vertical axis shows distance between camera and ladar system output window before camera damage occurs (for standard ladar energy). The horizontal axis shows the set point values with respect to laser charge time. The dotted horizontal line at roughly 270 mm on the y-axis shows the measured pixel damage distance (from ladar system output window to phone) when the ladar system does not employ adaptive feedback control as described above. In this example, the risk of damaging the camera due to light irradiation of the camera becomes greatly reduced at distances of more than roughly 270 mm (or roughly 10.5 inches) between the camera and the ladar system. The solid line plot (and dotted line linear curve fit) shows the reduction in range before the camera is damaged, versus the set point parameter (which defines the amount of laser energy transmitted versus intensity received). The set point is a unitless, out of 255, ADC quantization of the received signal, for an 8 bit byte/ADC. Accordingly, in this example, it can be seen that an example smart phone would experience camera damage when a ladar pulse without energy management strikes the camera from roughly 10.5 inches away. However, if adaptive shot energy control is used so that the shot energy for the subject ladar pulse shot is reduced (as shown by the x-axis where smaller set point values (charge times) would correspond to less shot energy), it can be seen that the adaptive ladar system would require the smart phone camera be much closer to the ladar system in order to experience damage. While FIGS. 12A and 12B describe an application of adaptive shot energy management to protecting smart phone cameras, it should be understood that these shot energy management techniques can also be extended to other areas such as minimizing interference for free space optics communications and/or ladar-to-ladar pulse return contamination.

Thus, at step 2, the ladar system can use the object monitoring from step 1 to adaptively adjust shot energy in a manner that reduces the risk of damaging a smart phone within the target region. For example, if step 1 detects a cell phone in the region around range point ABC, the ladar system can select a charge time set point value for the ladar pulse targeting ABC as a function of the detected range (e.g., see FIG. 12B) so that camera damage risk is reduced. The ladar pulse shot with its energy controlled as per step 2 can then be fired at the targeted range point.

Subsequently, at step 3, if the ladar return data indicates that the camera persists in the field of view, the ladar system can then adjust its shot list to exclude illumination of the camera (see, e.g., FIG. 6).

Synthetic Ladar Frames

In another example embodiment, interpolation techniques and the like can be used to fill data gaps in a sparse array of ladar return data. For example, as described in the above-referenced and incorporated patent applications, the ladar system 100 can employ compressive sensing to dynamically scan the field of view and intelligently target only a small subset of range points in the field of view. In this fashion, the ladar system can focus its targeting on the areas of interest in the field of view that are believed to be the most salient for safety and accurate object detection while avoiding overly shooting into empty space. With compressive sensing, the ladar system will produce sparse arrays of ladar return data for each ladar frame. This permits the ladar system 100 to exhibit a much higher frame rate while not losing any meaningful detection coverage. However, many downstream applications that process ladar data to perform image classification and object tracking may be designed with a standardized interface with ladar systems. With such standardized interfaces, it may be desirable, for software interoperability for instance, for the ladar frames to exhibit some fixed size or minimum size. Accordingly, to make a dynamic ladar system that employs compressive sensing compatible with such downstream image processing applications, a practitioner may want to synthetically fill the sparse ladar frames produced by the ladar system 100 with information derived from the sparse array of ladar return data.

Figure 13A:
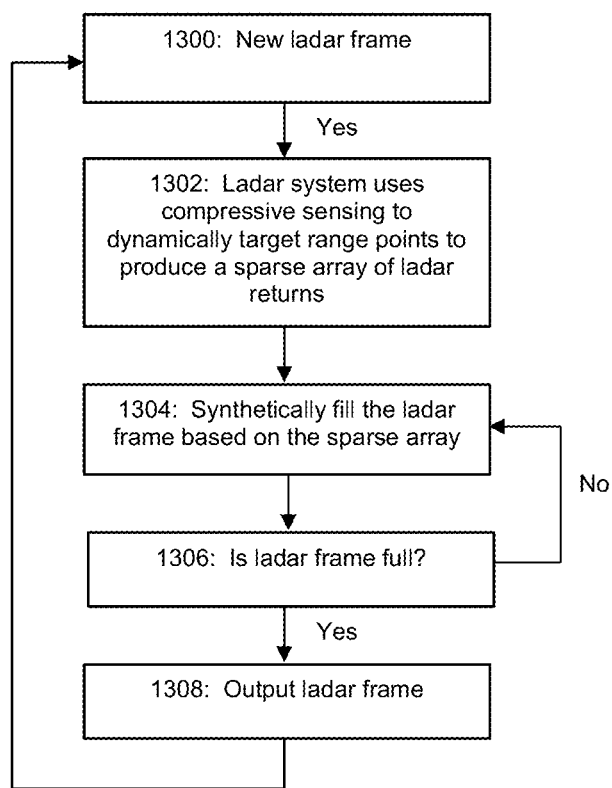
FIG. 13A shows an example process for synthetically filling a ladar frame from a sparse array of ladar return data.

FIG. 13A shows an example process flow for creating synthetic ladar frames in this fashion. At step 1300, the system decides whether to collect a new ladar frame. If so, the process flow proceeds to step 1302. At step 1302, the ladar system 100 uses compressive sensing to dynamically target a number of range points as discussed in the above-referenced and incorporated patent applications. This produces a sparse array of ladar return data.

At step 1304, a processor synthetically fills a ladar frame based on the data in the sparse array. In doing so, the processor is able to fill the empty gaps (the non-targeted range points) in the field of view between the various range points that had been targeted with ladar pulse shots. Interpolation techniques such as those discussed above can be used to fill in these gaps between ladar pulse return data from the sparse array. The gap filling can be done using any data extrapolation method, examples of which are available in MatLab and other software packages, such as polynomial interpolation, or iterative projection onto convex sets. The spatial index of prior ladar return data can be leveraged at step 1304 to accelerate the calculations that will drive step 1304. For example, if the processor can use the ladar return data from the spatial index for a plurality of range points that are near a blank range point to be synthetically filed to facilitate an interpolation or other filling computation that allows the processor to synthetically compute hypothetical synthetic return data for the non-targeted range point. This process can be iteratively repeated for different non-targeted range points (or non-targeted regions in the coordinate space), until the ladar frame is deemed full (step 1306). Once full, the synthetically-filled ladar frame can be output at step 1308 for consumption by a downstream image processing application such as an image classification or object detection application.

It should be noted that because step 1304 does not require any additional scanning by the ladar system's mirrors as well as transmit/receive propagation delays, it is expected that step 1304 can be performed with low latency relative to the time that would be needed to physically scan and interrogate the non-targeted range points via ladar pulses, particularly if sufficiently powerful compute resources are used such as parallel processing logic. In this fashion, it is expected that the frame rate for the FIG. 13A process flow will be faster than the frame rate available from conventional ladar systems that employ a conventional fixed raster scan to produce ladar frames.

Figure 13B:
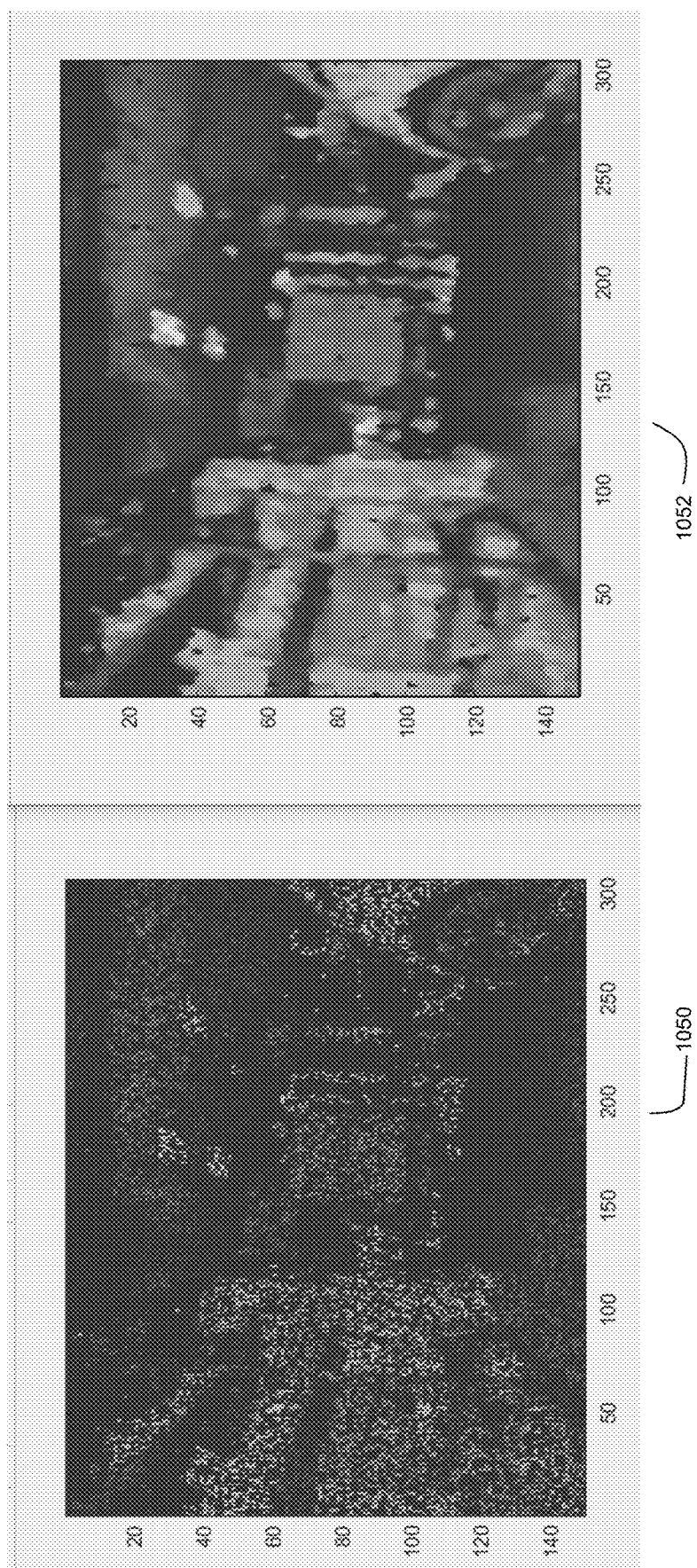
FIG. 13B shows examples of images derived from a sparse ladar array and a synthetically-filled ladar array.

FIG. 13B shows both image 1050 of a sparse array of ladar return data and an image 1052 of a synthetically-filled frame derived from the sparse array of ladar return data. Image 1050 in this example corresponds to a sparse array that covers around 30% of the field of view with ladar returns from interrogated range points. Image 1052 shows a synthetic full frame corresponding to the same sparse array that was constructed using a quad tree index of the sparse array and interpolation of the ladar return data in the sparse array. As noted above, such a synthetic frame may be more compatible with existing image processing/object detection applications, and it is also more intuitive for human consumption.

With the example approach of FIG. 13A as exemplified by FIG. 13B, the system can use super-resolution to interpolate, which allows for the dropping of ladar shots that would otherwise be taken. For example, the system can drop randomly selected ladar shots. With reference to FIG. 13B, the image at left can be obtained after dropping around ⅔rds of the ladar shots. With super-resolution, the image at the right of FIG. 13B can be obtained, which is virtually indistinguishable from a full collection in quality, but requires approximately $\frac{1}{3}^{rd}$ of the time to collect as compared to the full collection.

Figure 14:
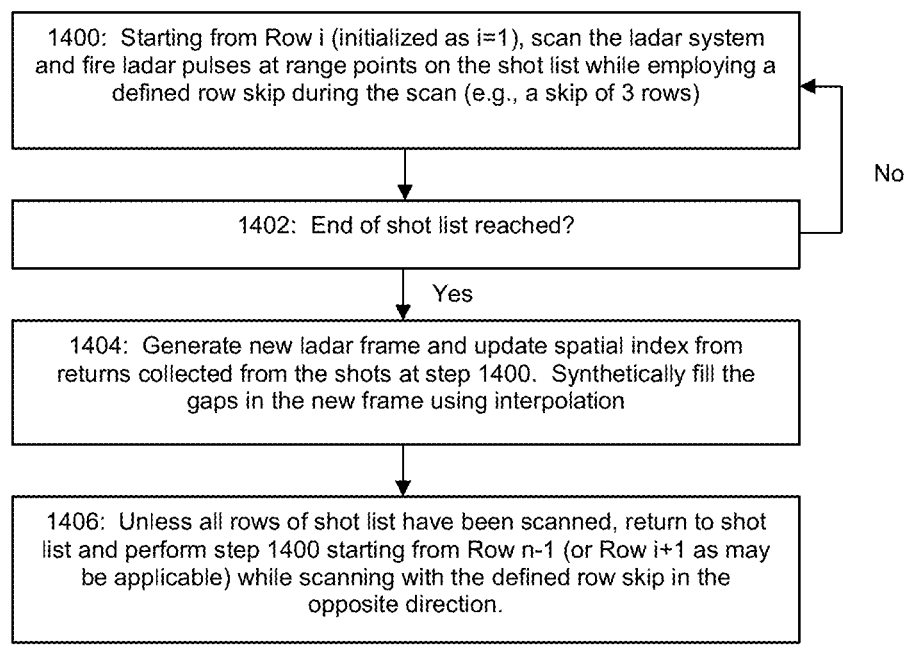
FIG. 14 shows an example process for synthetically filling ladar frames from using a rolling shutter technique.

In another example embodiment, the synthetic ladar frame can be generated in coordination with a rolling shutter technique. An example of such a rolling shutter technique is shown by FIG. 14. Through the rolling shutter technique, the system can quickly find motion while at the same time creating a sparse data set. As an example, suppose the addressable shot list for the ladar system has 1000 rows; in other words there are 1,000 different values in elevation (y value using earlier notation) that the laser can point at when firing shots. With a rolling shutter technique, the ladar system will skip rows in the scan pattern at regular intervals (see step 1400), and then repeat the process in the other direction (see step 1406), and so on until all of the rows are captured. For example, with the 1000 row example, the ladar system can scan the top horizontal line (row 1), then scan the $4^{th}$ horizontal line (row 4), and so forth until the ladar system scans horizontal lines 997 and 1000 (rows 997 and 1000) respectively. Then, the ladar system would scan upward, starting from the third to last horizontal line (row 998), then horizontal line/row 995, and so on up to the horizontal line/row that is $2^{nd}$ from the top (row 2). Next, the ladar system scans downward from the third horizontal line/row (row 3), to the seventh horizontal line/row, $11^{th}$ horizontal line/row, and so on until horizontal line row 999 (at which point the ladar system will have scanned every row. With such an approach, the ladar system can still be creating a sparse image data set if the ladar system is sampling sparsely within the horizontal lines/rows (even though all horizontal lines/rows are covered).

With such a "rolling" ladar frame, there is a benefit in that the ladar system gets near every point in the image roughly twice as fast as one would by scanning each row in succession. Therefore, anything that enters the frame which exhibits a size of three or more horizontal lines/rows or more can be detected twice as fast. New ladar frames can be generated each time the shot list has been scanned in a given direction (step steps 1402 and 1404). Synthetic filling techniques as described at step 1304 of FIG. 13A can be applied at step 1404 to fill each frame.

Furthermore, if these synthetic frame techniques are combined with fast velocity estimation as described in U.S. patent application Ser. No. 16/106,406, entitled "Low Latency Intra-Frame Motion Estimation Based on Clusters of Ladar Pulses", filed Aug. 21, 2018, the entire disclosure of which is incorporated herein by reference, the ladar system can obtain an interpolated dense image of a static background scene and target motion at the same time. Velocity estimations of a moving object in the image can be obtained using the current position of the object in the current synthetic frame and the prior position of the object in the previous synthetic frame, assuming that the radius parameter R discussed earlier is less than the width and height of the moving object. For example, the current synthetic frame can be based on an ascending traversal of the shot rows while the prior synthetic frame can be based on the immediately preceding descending traversal of the shot rows. Assuming that the moving object encompasses three or more horizontal lines/rows, this permits the ladar system to estimate velocity based on their relative positions in the synthetic frames. Given that the synthetic frames are being generated faster than a conventional full ladar frame, this improves the speed by which the ladar system can detect and track object velocity. Also, if desired, a practitioner need not reverse the scan direction for each traversal of the shot list at step 1406.

Optical Flow for Target Tracking Using Spatial Index Interpolation

Figure 15:
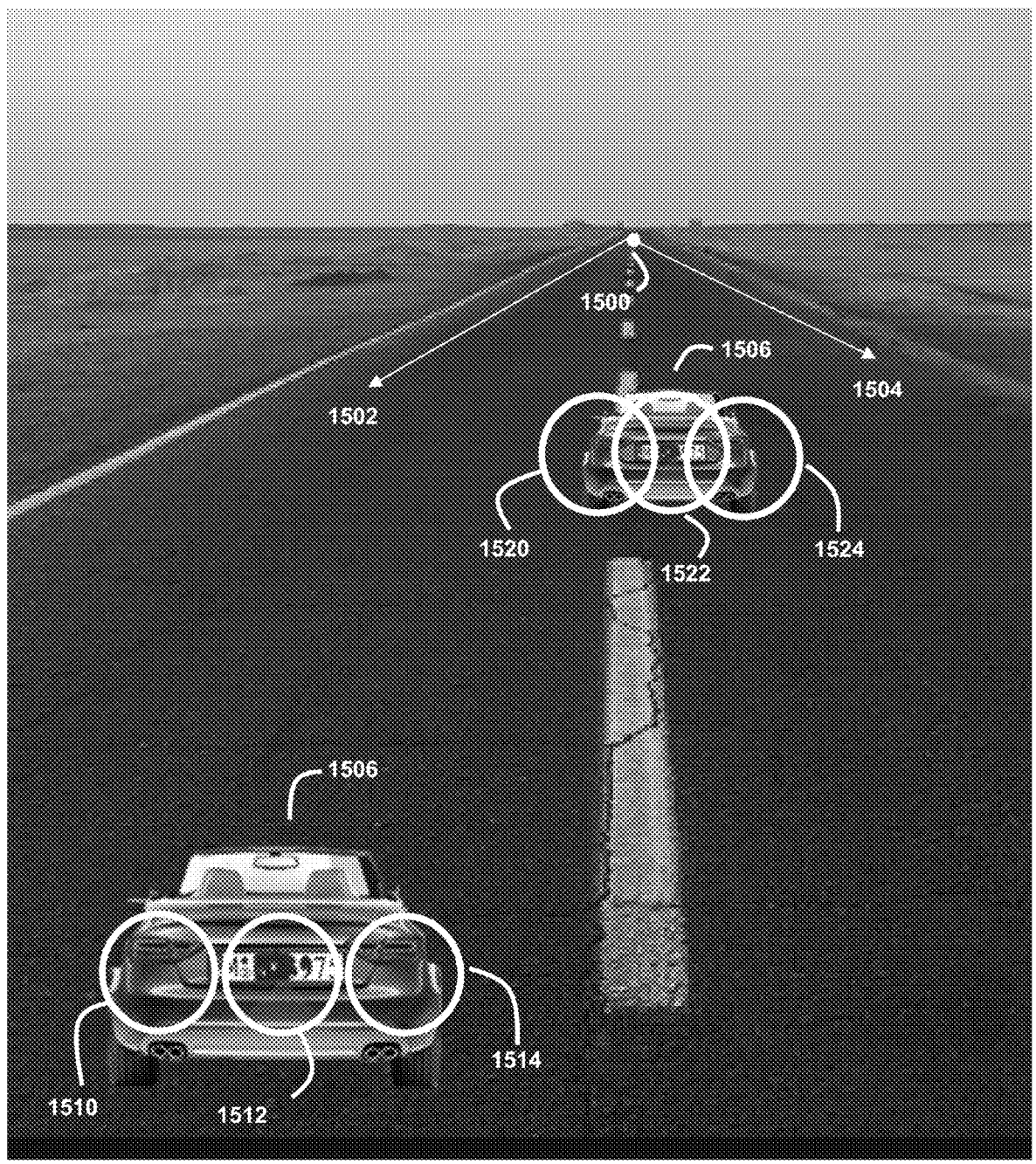
FIG. 15 shows an example scene that illustrates an optical flow concept with respect to moving vehicles.

In another example embodiment, the spatial index-based interpolation techniques described herein can be used in combination with optical flow techniques for target tracking. FIG. 15 shows an example of optical flow as it can relate to a moving vehicle 1506. In the example of FIG. 15, the scene from the perspective of a moving vehicle equipped with a ladar system is shown. The scene ahead is shown in the azimuth (cross range) and elevation (height) dimensions. Arrows 1502 and 1504 show how a pixel 1500 at the road horizon will "flow" or "split" into a left trajectory (see arrow 1502) and a right trajectory (see arrow 1504) as motion forward continues. Techniques for the use of optical flow for machine vision based on images from video cameras are described in Meinhardt-Llopis, et al., "*Horn-Schunck Optical Flow with a Multi-Scale Strategy*", Image Processing On Line, Jul. 19, 2013, 22 pages, the entire disclosure of which is incorporated herein by reference.

However, the use of optical flow in ladar systems is complicated by at least two factors: (1) with ladar systems, only a small fraction of the scene is usually illuminated/interrogated (e.g., even with raster scan approaches, beam steps may be 1 degree with a beam divergence on the order of 0.1 degree)—in which case much of the information needed for full scale optical flow is not available and must be estimated, and (2) unlike video systems (which operate in angle/angle (steradian) space—and which delivers angular pixel sizes that are independent of range), ladar systems work with voxels (volume pixels) that exhibit a size which grows with depth. Because the sizes of voxels grow with depth, the optical flow calculation for ladar systems will need to account for aligning data at different distances. For example, with reference to FIG. 15, the same car 1506 is shown on the same image as it appears on a road at two distinct points in time. At near range, it can be seen that the beams 1510, 1512, and 1514 for different ladar shots can separately interrogate the taillights and license plate. However, at longer range, it can be seen that the beams 1520, 1522, and 1524 will be overlapping with respect to the taillights and license plate. Accordingly, at longer ranges, interpolation or super-resolution is desired because various objects in the scene (such as taillights and license plates) are not separated across beams.

Furthermore, while the depth information that is available from a ladar system helps with object tracking, it can be a complicating factor for arresting self-motion of the ladar system. However, the ability to use the spatial index as discussed above to interpolate returns not only helps solve complicating factor (1) discussed above, but it also allows for the system to generate fixed size optical flow voxels, which helps solve complicating factor (2) discussed above.

The spatial index-based interpolation can generate fixed size voxels as follows. If the object (car) is at close range, then the shots themselves are fine-grained, and no interpolation is needed. At longer range—where the actual data voxels are spaced wider apart—the spatial index-based interpolation techniques can be used to obtain a finely-spaced sampling. For example, suppose at 10 m the shot grid delivers samples spaced every foot apart. At 100 m, the same shot list produces voxels 10 feet apart. But, given this widely-spaced data, one can interpolate using the spatial index (e.g., see equation (3) above) to effectively resample at one foot spacing.

Figure 16:
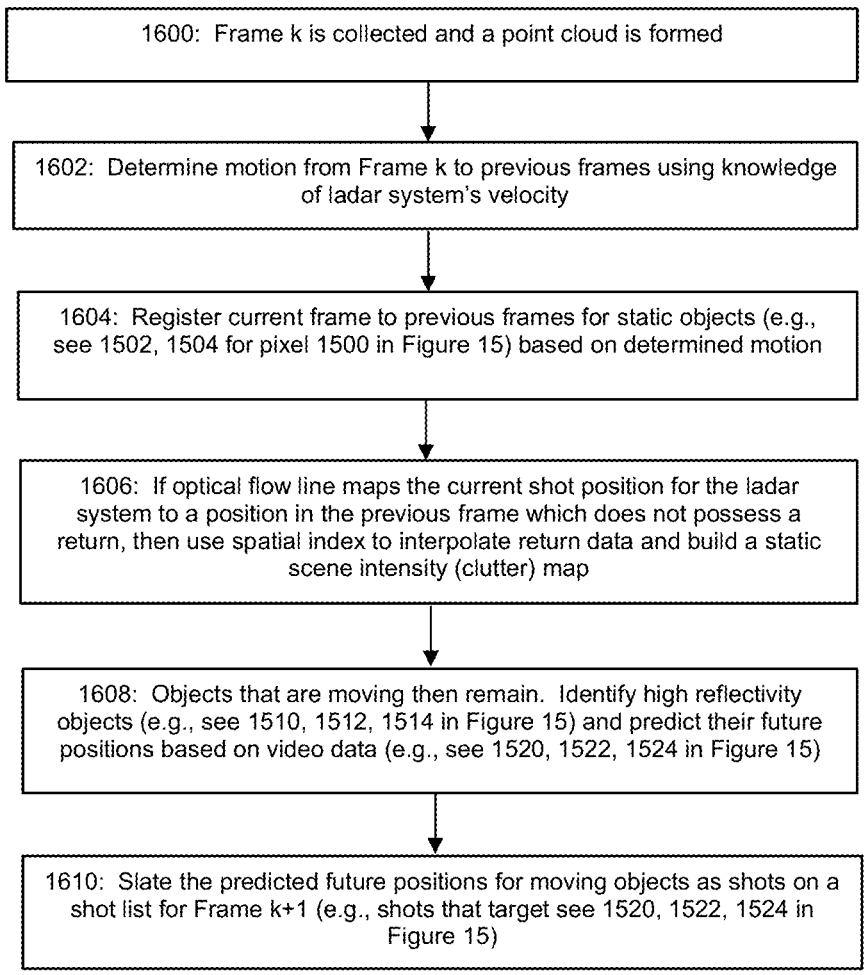
FIG. 16 shows an example process flow where the spatial index of prior return data can be used in combination with optical flows to adaptively control shot selection.

FIG. 16 shows an example process flow where the spatial index of prior return data can be used in combination with optical flows to adaptively control shot selection. At step 1600, the ladar system fires ladar pulse shots for Frame k, and it forms a point cloud from the return data for Frame k.

At step 1602, the system determines the motion from Frame K to previous frames using knowledge of the ladar system's velocity. Step 1602 can be performed using techniques such as arrested synthetic aperture imaging (SAI), or image stacking. For example, in principle, when a person is a passenger in a car driving past a wheat field, that person will notice the wheat ahead appears to move must faster than wheat directly to the person's side, if in both cases a reference point (e.g., wheat stock) is picked at the same radial distance. Arrested SAI uses this fact, combined with knowledge of the car motion, to align (stack) images frame to frame. By determining the motion between frames, the system can register the current frame to previous frames for static objects depicted in those frames (e.g., see 1502 and 1504 in FIG. 15 for pixel 1500). This allows for optical flows to be defined across frames for the static objects that are depicted in the frames. So, for example, if there are two images, A and B, of a clump of wheat stored in a spatial index, each pixel of each image can be tagged with apparent velocity.

Then, at step 1606, the system can determine whether an optical flow line maps the current shot position for the ladar system to a position in the previous frame for which there is not a ladar return. If the shot position maps to an optical flow line for which there is not prior return data, the system can leverage the spatial index of prior return data to interpolate the return data for the current shot position using the spatial index interpolation techniques described above. There are several techniques for choosing what points to use as a basis for interpolation. One example is to use the points which are the subject points in the prior frame. Another technique is to use edge detection to find the boundary of an object, and then store the associated voxels which form that boundary edge from the prior frame as the basis for interpolation in the current frame. By doing so for the optical flow lines found at step 1604, the system is able to build a static scene intensity (clutter) map for the static aspects of the scene.

This leaves the objects in the scene that are moving. For these objects, the ladar system can include a camera that produces camera images of the scene (e.g., camera data such as video RGB data). Moving objects with defined characteristics can then be detected within the camera images. For example, moving objects with high reflectivity (e.g., the taillights and license plate shown in FIG. 15) can be detected in the camera data, and by processing camera data over time, the system can predict the future positions of these moving objects (e.g., by tracking changes in location within motion-reconciled camera images over time). The prediction can be achieved using knowledge about the ladar system's motion (e.g., the motion of a vehicle equipped with the ladar system). For example, if the ladar system is known to be moving at 10 m/s, and a road sign 50 m in front of the ladar system is seen, a prediction can be made that, barring any acceleration, the sign (assumed stationary) will be 40 m away in one second in the future. Thus, with reference to FIG. 15, if car 1506 is speeding away from the ladar system, the system can predict that the taillights and license plate which are at 1510, 1512, and 1514 at time t=t0 will be located at 1520, 1522, and 1524 at time t=t0+x.

Next, at step 1610, the system can schedule ladar shots that target the predicted future positions for those moving objects as determined at step 1608. Accordingly, with reference to the example of FIG. 15, for Frame k+1, the system can define ladar shots that will target 1520, 1522, and 1524 based on the prediction that this will be the location of the taillights and license plate at that time. In this fashion, optical flow techniques can be combined with the spatial index interpolation techniques to adaptively control shot selection for the ladar system. With this adaptive shot selection, the ladar system can reduce the number of ladar shots that are needed for the scene while retaining or augmenting the shots that are targeted to the important and salient parts of the scene.

While FIGS. 15 and 16 describe an example of optical flow for the horizon as well as points on a fixed vehicle, it should be understood that other embodiments are possible. For example, spatial index interpolation for ladar systems can be used to track red objects in a video camera. For automotive applications, red is almost always associated with highly reflective materials that provide key information, such as brake lights on a car or stop signs. Accordingly, using this color channel for adaptive ladar sensing can be very useful, and there is little chance that an erroneous red "clutter" sample will arrive and confuse the frame-to-frame tracker.

While the invention has been described above in relation to its example embodiments, various modifications may be made thereto that still fall within the invention's scope. Such modifications to the invention will be recognizable upon review of the teachings herein.

What is claimed is:

1. An adaptive ladar system comprising:
 a ladar receiver configured to receive incident light and detect ladar returns from a plurality of ladar pulse shots based on the received incident light;
 a memory configured to spatially index prior ladar return data by location in a coordinate space, wherein the prior ladar return data is derived from returns detected by the ladar receiver from prior ladar pulse shots; and
 a processor configured to (1) search the spatially indexed prior ladar return data to access prior ladar return data stored in the memory for one or more locations in the coordinate space that are within a defined vicinity around a targeted location in the coordinate space for a new ladar pulse shot, (2) perform an analysis of the accessed prior ladar return data, and (3) define a control parameter for the ladar receiver based on the analysis; and
 wherein the ladar receiver is further configured to detect a ladar return for the new ladar pulse shot based on the defined control parameter.

2. The system of claim 1 wherein the spatially indexed prior ladar return data is organized in the memory as a quad tree index.

3. The system of claim 1 wherein the control parameter comprises a detector threshold used by the ladar receiver.

4. The system of claim 3 wherein the ladar receiver includes an analog-to-digital converter (ADC), and wherein the detector threshold comprises an ADC detection threshold.

5. The system of claim 1 wherein the control parameter comprises a comparison threshold used by the ladar receiver.

6. The system of claim 5 wherein the ladar receiver includes a time-to-digital converter (TDC), and wherein the comparison threshold comprises a TDC comparison threshold.

7. The system of claim 1 wherein the ladar receiver comprises a photodetector array and an amplifier, the photodetector array configured to convert incident light on the ladar receiver into a signal, the amplifier configured to amplify the signal, and wherein the control parameter comprises a gain setting for the amplifier.

8. The system of claim 1 wherein the processor is further configured to repeat the define operation on a shot-by-shot basis for a plurality of new ladar pulse shots.

9. The system of claim 1 wherein the spatially indexed prior ladar return data comprises a tree structure having a root node, a plurality of branches, and a plurality of leaf nodes, wherein the leaf nodes associate the prior ladar return data with corresponding locations in the coordinate space.

10. The system of claim 1 wherein the prior ladar return data comprises intensity data for the ladar returns from prior ladar pulse shots.

11. The system of claim 1 wherein the prior ladar return data comprises range data for the ladar returns from prior ladar pulse shots.

12. The system of claim 1 wherein the prior ladar return data comprises noise level data for the ladar returns from prior ladar pulse shots.

13. The system of claim 1 wherein the prior ladar return data comprises pulse shape data for the ladar returns from prior ladar pulse shots.

14. The system of claim 1 wherein the coordinate space comprises an azimuth-elevation grid.

15. The system of claim 1 wherein the spatially indexed prior ladar return data spatially indexes the prior ladar return data for a ladar frame.

16. The system of claim 1 wherein the spatially indexed prior ladar return data spatially indexes the prior ladar return data over a defined time period.

17. The system of claim 1 wherein the defined vicinity is an adjustable value.

18. The system of claim 1 further comprising a ladar transmitter, wherein the ladar transmitter includes a plurality of scanable mirrors;
wherein the processor is further configured to dynamically schedule a plurality of ladar pulse shots for the ladar transmitter to target a plurality of range points in the coordinate space;
wherein the ladar transmitter is further configured to (1) controllably scan the scanable mirrors to target the ladar transmitter at the targeted range points in accordance with the scheduled ladar pulse shots and (2) transmit a plurality of ladar pulse shots toward the targeted range points via the controllably scanned mirrors, and wherein the transmitted ladar pulse shots include the new ladar pulse shot.

19. The system of claim 18 wherein the processor is further configured to perform the dynamic scheduling on a shot-by-shot basis.

20. The system of claim 1 wherein the processor comprises a field programmable gate array (FPGA).

21. The system of claim 1 wherein the spatially indexed prior ladar return data is organized in the memory as a hierarchical tree structure, the hierarchical tree structure comprising a plurality of leaf nodes and a plurality of branch nodes, wherein the leaf nodes are associated with different locations in the coordinate space, wherein each branch node has a plurality of the leaf nodes as descendants in the hierarchical tree structure through one or more hierarchical levels of the hierarchical tree structure, and wherein the prior ladar return data is stored in the leaf nodes according to correspondence between the locations associated with the leaf nodes and the locations in the coordinate space for the prior ladar return data.

22. The system of claim 21 wherein each branch node encodes status information indicative of whether any of its descendant leaf nodes contain active prior ladar return data; and
wherein the processor is further configured to (1) search the hierarchical tree structure based on the encoded status information in the branch nodes to identify one or more leaf nodes that are (i) within the defined vicinity and (ii) contain active prior ladar return data and (2) perform the analysis on the active prior ladar return data contained by the one or more identified leaf nodes.

23. An adaptive system comprising:
a ladar receiver configured to receive incident light and detect ladar returns from a plurality of ladar pulse shots based on the received incident light;
a memory configured to spatially index ladar return data for prior ladar pulse shots by location in a coordinate space, wherein the spatially indexed ladar return data comprises a tree structure having a root node, a plurality of branches, and a plurality of leaf nodes, wherein the leaf nodes associate the ladar return data with corresponding locations in the coordinate space; and
a processor configured to (1) traverse the tree structure based on a targeted location in the coordinate space for a new ladar pulse shot to identify leaf nodes in the tree structure that include ladar return data associated with locations in the coordinate space that are within a defined vicinity of the targeted location, (2) extract ladar return data from the identified leaf nodes, and (3) define a control parameter for the ladar receiver based on an analysis of the extracted ladar return data; and
wherein the ladar receiver is further configured to detect a ladar return for the new ladar pulse shot based on the defined control parameter.

24. The system of claim 23 wherein the processor is further configured to repeat the define operation on a shot-by-shot basis for a plurality of new ladar pulse shots;
wherein a shot list defines a scheduled order of the new ladar pulse shots; and
wherein the processor is further configured to, for each of a plurality of the new ladar pulse shots on the shot list, (1) traverse the tree structure based on a targeted location in the coordinate space for that new ladar pulse shot to identify leaf nodes in the tree structure that include ladar return data associated with locations within the defined vicinity of the targeted location for that new ladar pulse shot, (2) extract ladar return data from the identified leaf nodes for that new ladar pulse shot, (3) pre-compute a factor for the control parameter corresponding to that new ladar pulse shot based on a plurality of data values within the extracted ladar return data for that new ladar pulse shot, and (4) compute the control parameter with respect to the new ladar pulse shot based on the pre-computed factor for that new ladar pulse shot.

25. The system of claim 24 wherein the processor is further configured to update the tree structure leaf nodes with ladar return data from the new ladar pulse shots.

26. The system of claim 23 wherein the processor is further configured to (1) perform the analysis such that the analysis includes an interpolation of a plurality of data values within the extracted ladar return data and (2) define the control parameter based on the interpolation.

27. A method for adaptively controlling a ladar receiver that receives incident light and detects ladar returns from a plurality of ladar pulse shots based on the received incident light, the method comprising:
   spatially indexing prior ladar return data by location in a coordinate space, wherein the prior ladar return data is derived from returns detected by the ladar receiver from prior ladar pulse shots;
   searching the spatially indexed prior ladar return data to access prior ladar return data for one or more locations in the coordinate space that are within a defined vicinity around a targeted location in the coordinate space for a new ladar pulse shot;
   performing an analysis of the accessed prior ladar return data;
   defining a control parameter for the ladar receiver based the analysis; and
   the ladar receiver using the defined control parameters to detect a ladar return for the new ladar pulse shot.

28. The method of claim 27 wherein the spatially indexing step comprises arranging the prior ladar return data in a memory as a quad tree index.

29. The method of claim 27 further comprising:
   the ladar receiver receiving incident light and detecting ladar returns based on the received incident light; and
   wherein the control parameter comprises a detector threshold used by the ladar receiver.

30. The method of claim 29 wherein the ladar receiver includes an analog-to-digital converter (ADC), and wherein the detector threshold comprises an ADC detection threshold.

31. The method of claim 27 further comprising:
   the ladar receiver receiving incident light and detecting ladar returns based on the received incident light; and
   wherein the control parameter comprises a comparison threshold used by the ladar receiver.

32. The method of claim 31 wherein the ladar receiver includes a time-to-digital converter (TDC), and wherein the comparison threshold comprises a TDC comparison threshold.

33. The method of claim 27 wherein the ladar receiver comprises a photodetector array and an amplifier, the method further comprising:
   the photodetector array converting incident light on the ladar receiver into a signal; and
   the amplifier amplifying the signal; and
   wherein the control parameter comprises a gain setting for the amplifier.

34. The method of claim 27 further comprising repeating the defining and using steps on a shot-by-shot basis for a plurality of new ladar pulse shots.

35. The method of claim 27 wherein the prior ladar return data comprises intensity data for the ladar returns from prior ladar pulse shots.

36. The method of claim 27 wherein the ladar pulse shots are from a ladar transmitter that transmits ladar pulse shots into the coordinate space via a plurality of scanning mirrors, the method further comprising:
   a processor dynamically scheduling a plurality of ladar pulse shots for the ladar transmitter to target a plurality of range points in the coordinate space;
   the ladar transmitter controllably scanning the mirrors to target the ladar transmitter at the targeted range points in accordance with the scheduled ladar pulse shots; and
   the ladar transmitter transmitting a plurality of ladar pulse shots toward the targeted range points via the scanning mirrors, and wherein the transmitted ladar pulse shots include the new ladar pulse shot.

* * * * *